US009290966B2

(12) United States Patent
Hanchett, Jr.

(10) Patent No.: US 9,290,966 B2
(45) Date of Patent: Mar. 22, 2016

(54) SYSTEM FOR PROVIDING POWER AND DATA TRANSMISSION BETWEEN A DOOR AND A FRAME

(75) Inventor: Leland J. Hanchett, Jr., Cave Creek, AZ (US)

(73) Assignee: Hanchett Entry Systems, Inc., Phoenix, AZ (US)

( * ) Notice: Subject to any disclaimer, the term of this patent is extended or adjusted under 35 U.S.C. 154(b) by 946 days.

(21) Appl. No.: 13/528,397

(22) Filed: Jun. 20, 2012

(65) Prior Publication Data

US 2012/0267962 A1    Oct. 25, 2012

Related U.S. Application Data

(63) Continuation-in-part of application No. 12/778,502, filed on May 12, 2010, now Pat. No. 8,294,302.

(60) Provisional application No. 61/178,605, filed on May 15, 2009.

(51) Int. Cl.
| | |
|---|---|
| *H01F 38/00* | (2006.01) |
| *E05B 17/22* | (2006.01) |
| *H04B 5/00* | (2006.01) |
| *E05B 47/00* | (2006.01) |
| *G07C 9/00* | (2006.01) |
| *H02J 17/00* | (2006.01) |

(52) U.S. Cl.
CPC ............... *E05B 17/22* (2013.01); *H04B 5/0031* (2013.01); *H04B 5/0037* (2013.01); *H04B 5/0093* (2013.01); *E05B 2047/0061* (2013.01); *G07C 2009/00634* (2013.01); *H02J 17/00* (2013.01)

(58) Field of Classification Search
CPC .... E05B 17/22; H04B 5/0031; H04B 5/0037; H04B 5/0093
See application file for complete search history.

(56) References Cited

U.S. PATENT DOCUMENTS

| | | | |
|---|---|---|---|
| 4,929,005 A | | 5/1990 | Heinen |
| 5,341,083 A | * | 8/1994 | Klontz ............... B60L 11/1816 320/109 |

(Continued)

FOREIGN PATENT DOCUMENTS

| | | |
|---|---|---|
| DE | 3612761 A1 | 10/1987 |
| FR | 2677396 A1 | 12/1992 |

(Continued)

OTHER PUBLICATIONS

Buron, Emmanuel, "European Search Report," search completed Jun. 17, 2011, mailed Jul. 4, 2011 for European Application No. 10 005 140.8, Rijswijk, Netherlands.

*Primary Examiner* — Daniel Cavallari
(74) *Attorney, Agent, or Firm* — Woods Oviatt Gilman LLP; Ronald J. Kisicki, Esq.

(57) ABSTRACT

A system for providing wire-free and contact free electric power and communication connection in a security installation between a door and a frame. The cores, windings, and control circuits of first and second transformers portions are disposed in the frame and the door, respectively. Power applied to the first transformer portion induces a voltage and current in the second transformer portion when the door is in a closed position. Fiber optic cables housed within the transformer portions transmit and receive data between the door and the frame. Power transfer occurs at 100+ KHz and data transfer is in the range of 100 K baud. The transformers portions are compactly constructed and, in one aspect of the invention, may reside in an opening normally occupied by a dead bolt. In another aspect of the invention, the transformer portions are fixed and resonating circuitry is off-tuned to optimize output levels.

20 Claims, 24 Drawing Sheets

(56) References Cited

U.S. PATENT DOCUMENTS

| | | |
|---|---|---|
| 2002/0117896 A1 | 8/2002 | Gohara |
| 2008/0185918 A1* | 8/2008 | Metz .............. H01F 38/14 307/104 |
| 2009/0015075 A1* | 1/2009 | Cook .............. H04B 5/0037 307/149 |
| 2009/0025435 A1 | 1/2009 | Popowski |
| 2009/0308116 A1* | 12/2009 | Lambrou .......... E05B 47/02 70/277 |
| 2011/0127954 A1* | 6/2011 | Walley ............ H01M 2/0267 320/108 |

FOREIGN PATENT DOCUMENTS

| | | |
|---|---|---|
| WO | 0077330 A1 | 12/2000 |
| WO | 2006006834 A1 | 1/2006 |
| WO | 2007082959 A1 | 7/2007 |

\* cited by examiner

Simulation Circuits

SYSTEM FOR PROVIDING POWER AND DATA TRANSMISSION BETWEEN A DOOR AND A FRAME

This application is a continuation-in-part of pending U.S. application Ser. No. 12/778,502, filed May 12, 2010, entitled SYSTEM FOR PROVIDING POWER AND DATA TRANSFER BETWEEN A DOOR AND A FRAME, which claims the benefit of U.S. Provisional Application No. 61/178,605, filed May 15, 2009, both of which are incorporated herein by reference.

TECHNICAL FIELD

The present invention relates to systems for providing electric power/communication between a first object and a second object; more particularly, to such a system wherein said first and second objects are not physically connected electrically; and most particularly, to such a system wherein components and circuitry enable such power/communication at a Baud rate of essentially twice the frequency of the voltage being transferred between the first and second objects or, in an alternate embodiment, voltage transfer is at 20 KHz and data transfer is in the range of 100K baud. Further embodiments include compact packaging of the components and utilize fiber optic cables to enable communication between the first object and the second object.

BACKGROUND OF THE INVENTION

It is known in the art of security and electrically-controlled locks to use keypads and other input devices to provide secure access to buildings or other objects, e.g. safes, automobiles, and the like. In conjunction with this trend, a need has also developed for transmission of various types of functions or information relating to a door secured in a frame. For example, it can be desirable in a security application to provide power across a frame-door gap to the region around a lock in order to energize an actuator, solenoid, motor, etc, or to recharge a battery used in engaging/disengaging the lock, or power an identification device located on the door. It can also be desirable to determine the status or lock-state of the lock, i.e., whether the locking mechanism is engaged or disengaged or whether a door is open or closed. This status information must in some way be acquired and transmitted across the door-frame gap to a monitoring device such as a computer controller.

Prior art systems transfer power and/or data between a door and a door frame using wires that run through a mechanical hinge point or a set of spring loaded contacts that provide an electrical connection across the frame-door gap when the door is in the closed position. The problem with such a wire-based approach is that only very fine wires can be used since such wires must pass internally through the plates of the door hinges to avoid being severed in normal operation or by an intruder. Spring-loaded contacts present a different set of problems relating to contamination of the contacts and the risk of shocking a person passing through the door who might make contact with the 'live' contact set on the frame.

What is needed in the art is a robust and efficient system that provides wire-free power transfer between a frame and a door and also enables information or communication transfer, all the while avoiding the above shortcomings of prior art systems.

What is further needed in the art is a compact system that minimizes the area in the door that is taken up by the device or which can utilize the space already provided for a dead bolt, within a mortise lockset, for the compact system.

What is yet further needed in the art is a system wherein its circuitry optimizes power output of the device.

It is a principal object of the present invention to provide a compact, wire-free communications and power transmission system between a door and a frame.

SUMMARY OF THE INVENTION

Briefly described, the present invention provides transfer of power and/or data from a first object to a second object, such as a frame to a door, utilizing a split core transformer wherein portions of the core and windings are located in both the door and the frame. Status and data may be transmitted between a device located in the door and a device in the frame at data rates that are essentially twice the frequency of the voltage applied to the primary side of the split core transformer or up to 100 kHz in an alternate embodiment. In a further embodiment, status and data may be transmitted and received through use of fiber optic cables.

A door and frame equipped with a split core transformer in accordance with one aspect of the present invention comprise mating halves or portions of the transformer that provides wire-free and contact-free power transfer between the frame and the door and also enables information or communication transfer. The door frame comprises a subassembly of the split core transformer having a recessed portion housing a first transformer core portion having first windings. The associated door is provided with a spring-loaded subassembly of the split core transformer having a protruding portion fitted with a second transformer core portion having second windings. When the door is closed against the frame, the recessed portion in the frame is formed to receive the spring-loaded protruding portion of the door whereby the first and second core portions are aligned and brought into such close proximity as to minimize the air-gap between the cores, allowing transfer of power/data via magnetic induction from one transformer portion to the other. Such power/data may flow bi-directionally from either of the transformers halves to the other.

Power may be provided across the frame/door gap to energize a solenoid or other powered actuator for locking the door or to recharge a battery located in an identification device, such as an electronic combination locking device on the door. Preferably, a sensing winding is provided adjacent the primary winding of the first portion of the split core transformer to capture modulated alternating current from the secondary winding that is located in the second portion of the split core transformer.

In a further embodiment of the split core transformer, a door and a frame are equipped with mating transformer core portions that also provide wire-free and contact-free power and data transfer between the frame and the door. In one particular aspect of the further embodiment, the mating transformer core portions may be compact, pot core portions. In a first example of the further embodiment, the door frame includes a housing equipped with a first transformer core portion having first windings, while the associated door is provided with a spring-loaded protruding assembly fitted with a second transformer core portion having second windings. When the door is closed against the frame, the spring-loaded assembly aligns and brings the first and second transformer core portions within such close proximity so as to minimize the air-gap between the portions, thereby allowing transfer of power via magnetic induction from one transformer core portion to the other. Each transformer core portion may further be equipped with a fiber optic cable composed of numerous individually-clad fibers arranged coaxially so as to permit two-way communication between the frame and the door.

In a second example of the further embodiment, fixed transformer core portions approximately 1 inch in width are matingly fitted in a door and a door frame resulting in a varying gap between the transformer core portions, from one door/frame unit to the next, when the door is closed. Paired resonating circuits of the fixed transformer core portion are off-tuned so as to yield a more constant output level over a varying gap. In the second example, each transformer core portion may also be equipped with a fiber optic cable composed of numerous individually-clad fibers arranged coaxially so as to permit two-way communication between the frame and the door.

Additional benefits of the above described system and method for providing power and data communication respecting a door and lock are set forth in the following discussion.

BRIEF DESCRIPTION OF THE DRAWINGS

The present invention will now be described, by way of example, with reference to the accompanying drawings, in which.

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE PREFERRED EMBODIMENTS

Figure 1:
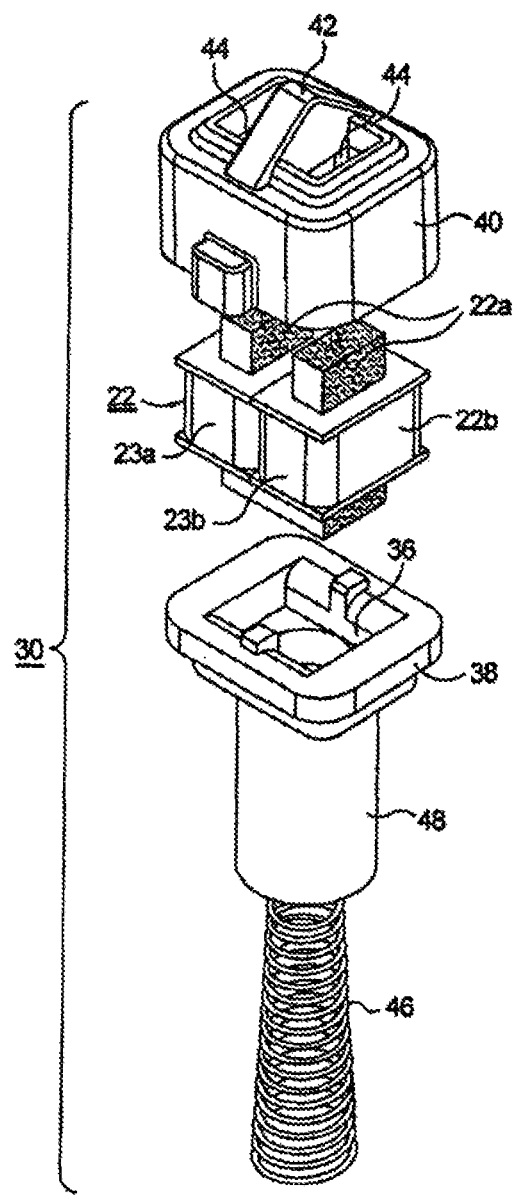
FIG. 1 is an exploded isometric drawing of a spring-loaded protruding subassembly in accordance with the present invention including a second transformer core portion.

In general, the system described herein for providing power and data transfer in accordance with the present invention may be implemented in a variety of hardware and software embodiments or combinations thereof.

Referring now to FIGS. 1 through 9, the present invention generally relates to a system 10 which contains a method for providing power to an entry system device 12 located on a door 14 hinged in a frame 16 and for providing data transfer between an entry system device 12 and its mating device 18 on the frame side of the door through a split core electromagnetic transformer 20 comprising first and second transformer core portions 24, 22 disposed respectively in frame device 18 and door device 12. The first embodiment provides circuitry to enable such communication to occur at a Baud rate of essentially twice the frequency of the voltage being transferred between the door and frame side.

Figure 9:
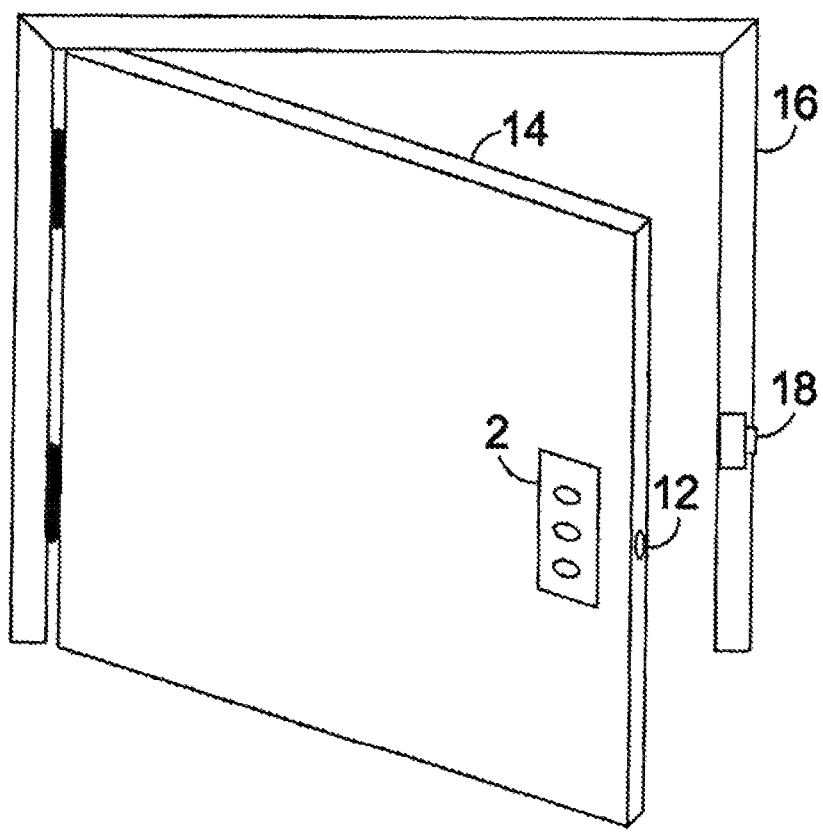
FIG. 9 is an isometric view of an exemplary installation in accordance with the present invention, showing an open door hinged in a frame, the door being equipped with a subassembly in accordance with FIGS. 1-3 and the frame being equipped with a subassembly in accordance with FIGS. 4 and 5.

The present invention is applicable to doors, windows, or other objects that are moveable relative to a frame or other fixed object, wherein there is a need to communicate without direct electrical connection between a device located on the first object and a device located on the second object. The invention is described herein with reference to an exemplary environment such as is shown in FIG. 9, wherein the first object is door 14 and the second object is door frame 16. As shown, door 14 may have attached thereto an electronic combination lock 26 or other similar entry system device such as a biometric reader, magnetic card reader, and the like. Importantly, such a device, such as electronic combination lock 26, requires communication with frame 16 and/or a supply of power from the frame side. Communication between door 14 and frame 16 may be for the purpose of exchanging information regarding such things as lock status or the keyed or inputted entry data provided at the lock, or to enable the reconfiguration of lock 26 with a new combination. Power to lock 26 may be required for normal operation or to recharge a battery (not shown) located therein. As will be appreciated by one skilled in the art, combination lock 26 may activate a solenoid (not shown), or other similar mechanism for latching, locking, opening, or otherwise maintaining the door in a particular position. In the presently described embodiment, device 12 engages device 18 when the door is in the closed position.

Figure 6:
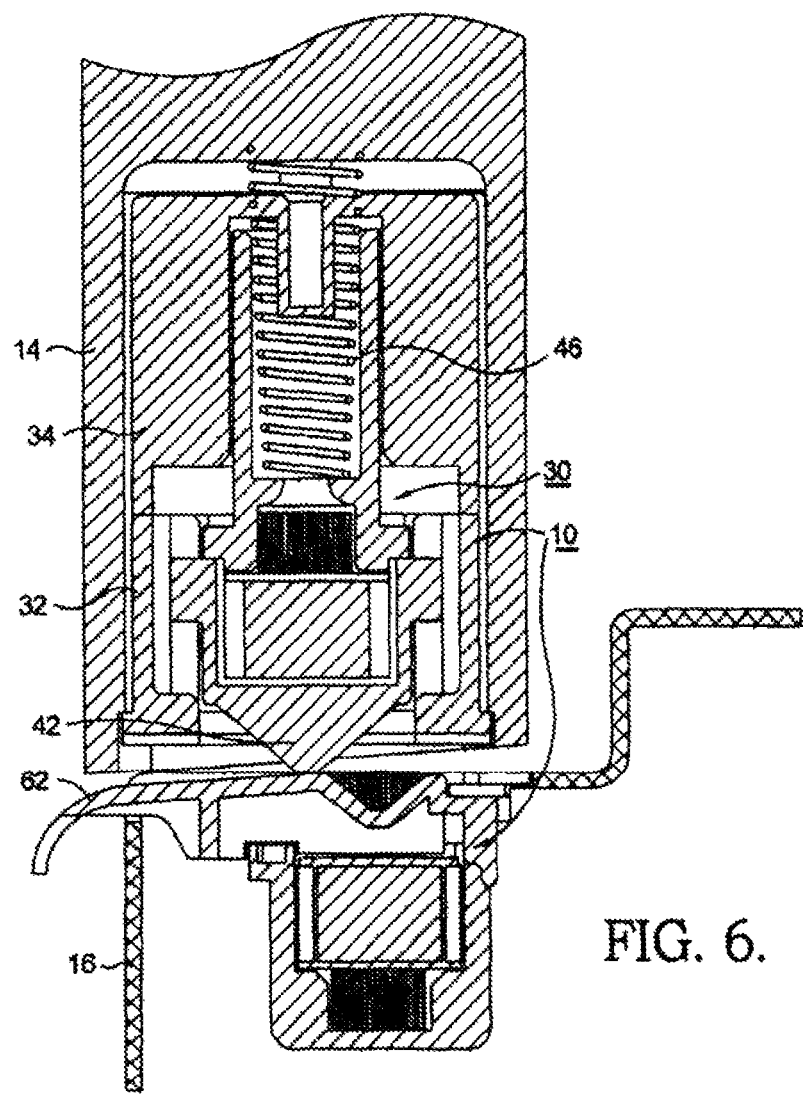
FIG. 6 is a first elevational cross-sectional view of a system for providing power and data transmission in accordance with the present invention, taken through the center of the two subassemblies and showing the subassembly shown in FIGS. 1-3 engaged but not yet nested with the subassembly shown in FIGS. 4 and 5.
Figure 7:
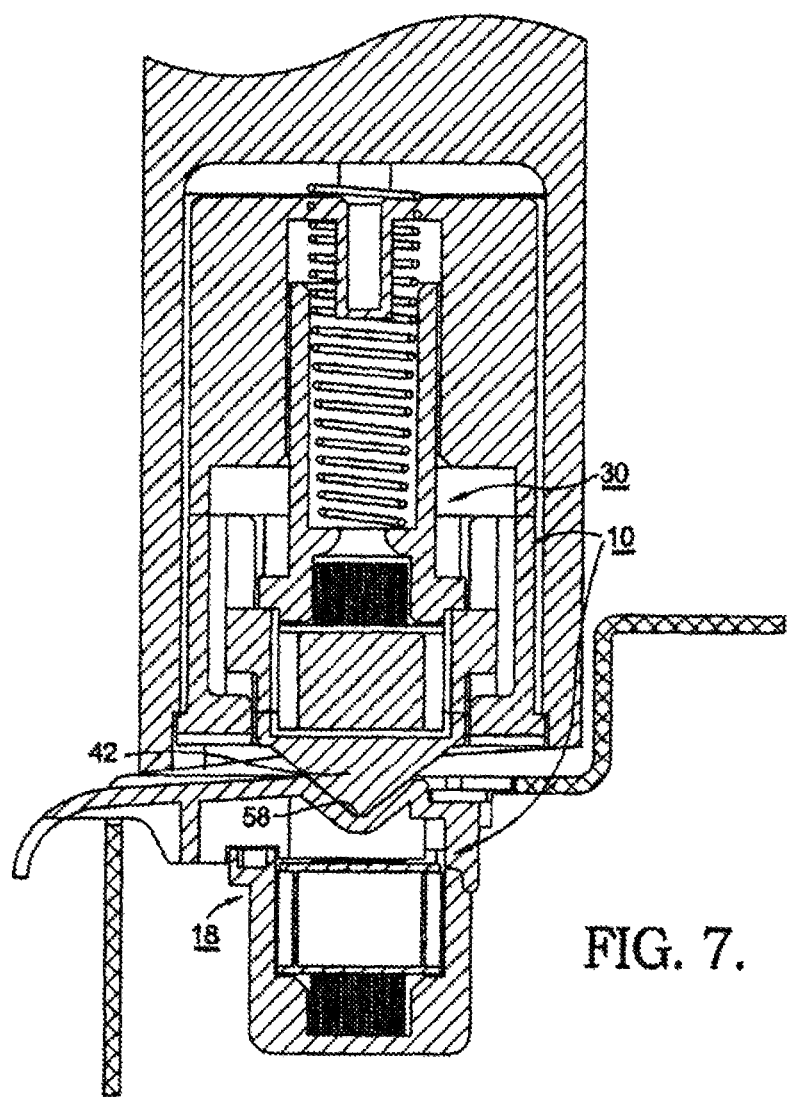
FIG. 7 is a sequential elevational cross-sectional view to that shown in FIG. 6, showing one subassembly engaged and nested with the other subassembly.
Figure 8:
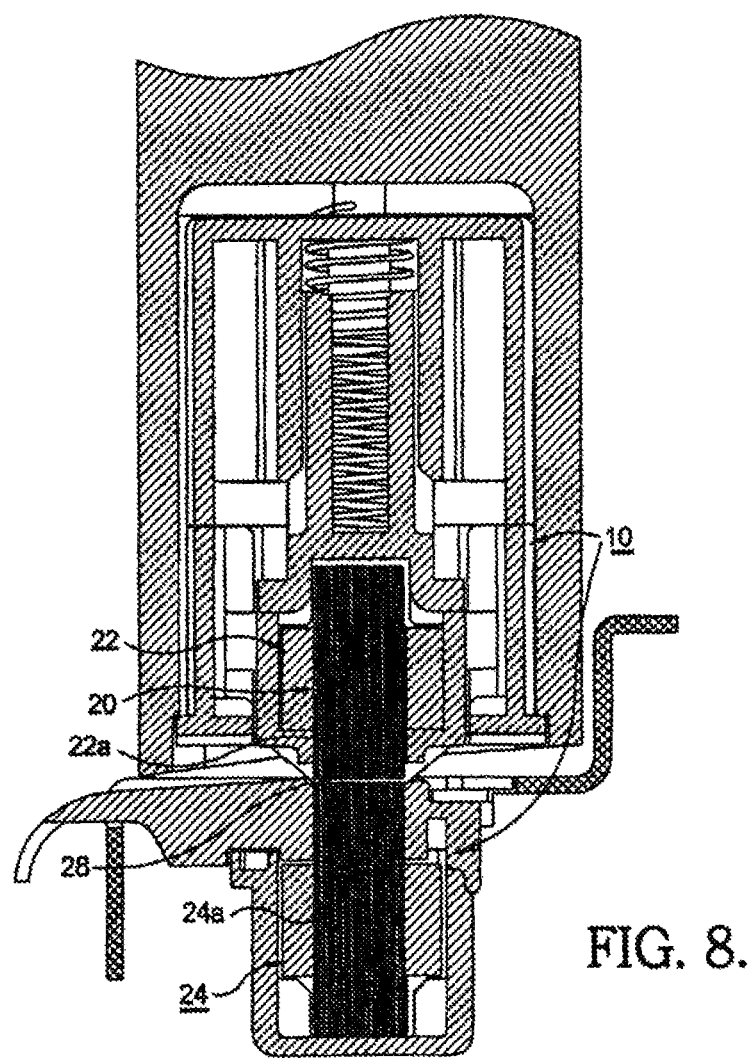
FIG. 8 is a second elevational cross-sectional view taken parallel to the view shown in FIG. 7, showing the relationship of the cores of the first and second transformer core portions when the subassemblies are nested together.

The system and method for the transfer of power and subsequently for the communication of data between door 14 and frame 16 may be described with initial reference to the perspective view of a split transformer 20 having a first transformer core portion 24 and second transformer core portion 22, as shown in FIGS. 6 through 8. It will be appreciated by one skilled in the art that a split core transformer 20 comprises two core halves 22a,24a each having one or more windings 22b,24b, the two halves being brought together in operation in as close a configuration as possible so as to reduce or eliminate any air-gap 28 (FIG. 8) between the cores halves 22a,24a of each transformer core portion 22,24. The illustrated second transformer core portion 22 comprises a U-shaped core half 22a having a pair of coil windings 23a, 23b located on each leg of core half 22a. First transformer core portion 24 similarly comprises a U-shaped laminated core half 24a and a pair of coil windings 25a,25b.

Figure 2:
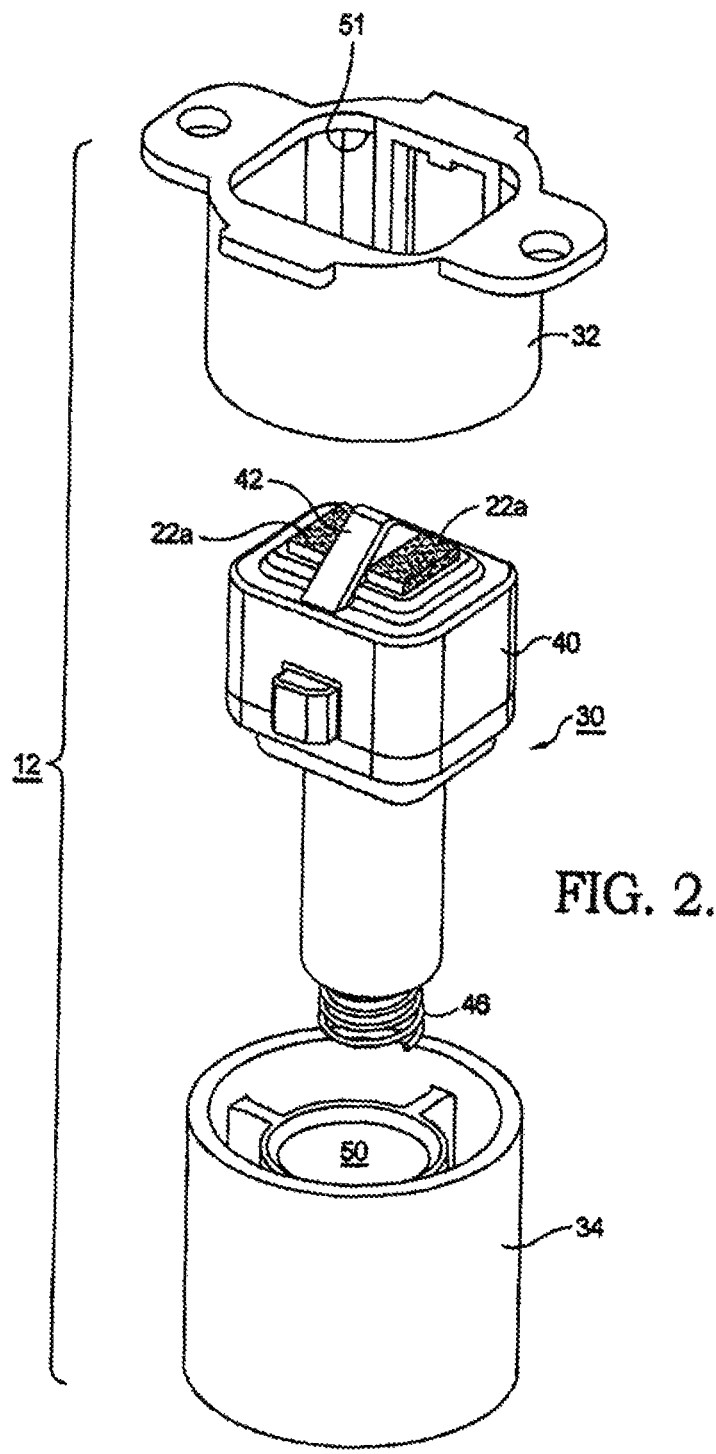
FIG. 2 is an exploded isometric drawing in accordance with the present invention comprising the subassembly shown in FIG. 1.
Figure 3:
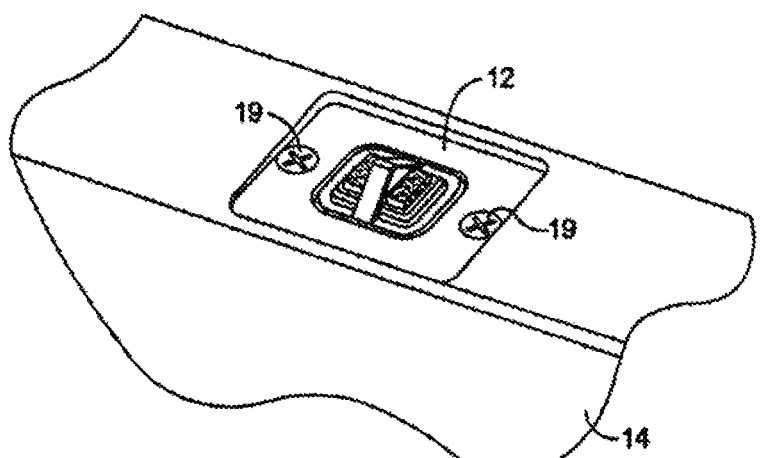
FIG. 3 is an isometric drawing showing the subassembly shown in FIG. 2 mounted in a second object such as a door.

Referring now specifically to FIGS. 1 through 3, device 12 comprises a protruding subassembly 30, an upper housing 32, and a lower housing 34 for receiving subassembly 30. Protruding subassembly 30 comprises second transformer core portion 22 as described above received in a well 36 in a lower fixture 38 and captured therein by an upper fixture 40 having a ramped portion 42 separating first and second openings 44 for receiving core half 22a. A compression spring 46 is seated in a spring retainer portion 48 of lower fixture 38. As received in upper and lower housings 32, 34, spring 46 is compressively disposed in well 50 in lower housing 34. Upper fixture 40 is slidably disposed in upper housing 32 and is urged against end flange 51 by spring 46. During engagement of device 12, subassembly 30 is free to be displaced axially within upper housing 32 and upon latching is returned by spring 46 to a predetermined correct position against flange 50 whereby legs of core half 22a are extended a correct distance through openings 44 in upper housing 40.

Figure 4:
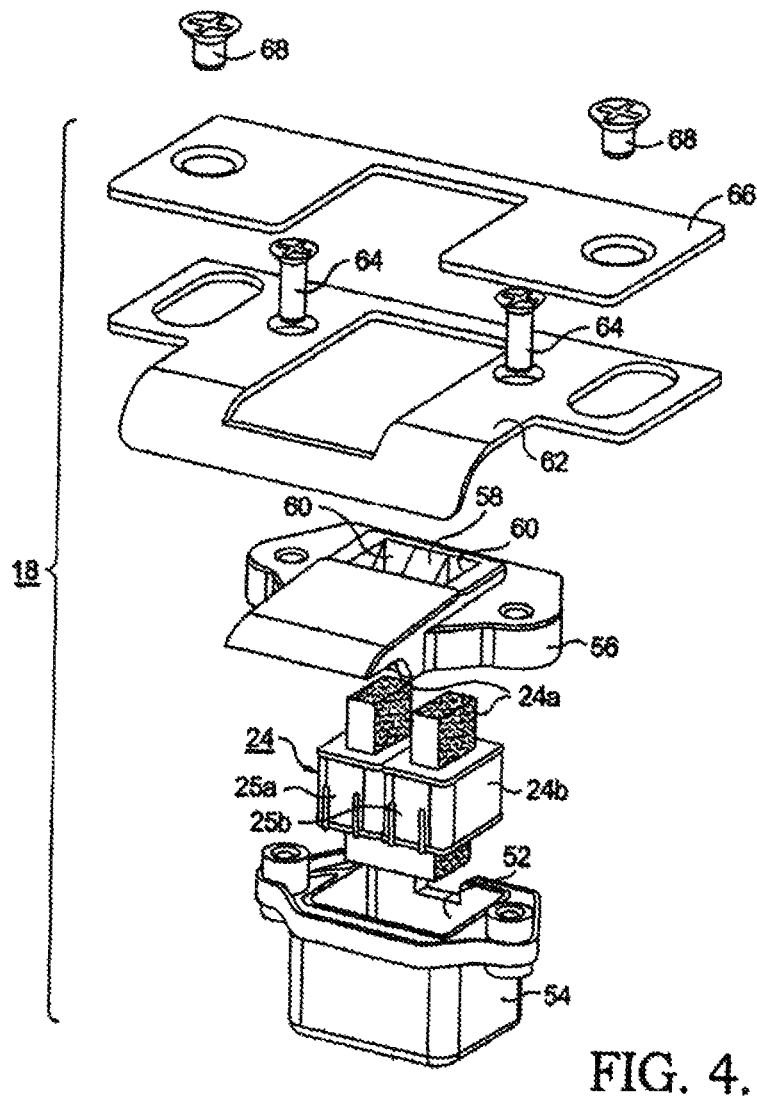
FIG. 4 is an exploded isometric drawing of a mating subassembly of the subassembly shown in FIGS. 1-3, in accordance with the present invention, comprising a first transformer core portion.
Figure 5:
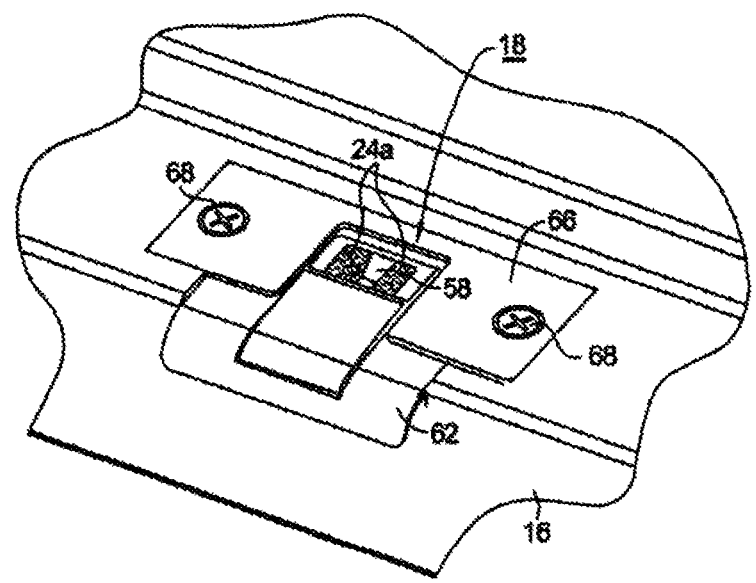
FIG. 5 is an isometric drawing showing the subassembly shown in FIG. 4 mounted in a first object such as a mating frame.

Referring now to FIGS. 4 and 5, device 18 comprises first transformer core portion 24 disposed in a well 52 in lower receiver housing 54 and is retained therein by upper receiver housing 56 having protruding assembly receiver 58 separating first and second openings 60 for receiving legs of core half 24a of first transformer 24. Striker plate 62 is secured to upper receiver housing 56 by screws 64, and device 18 is secured to frame 16 by retainer 66 and screws 68. Lower and upper receiver housings 54, 56 are formed such that the legs of core half 24a are extended a correct distance through openings 60 in upper housing 56.

In operation, device 12 and device 18 are located, respectively, in each of door 14 and frame 16; i.e., device 12 is bore-in installed in the edge of door 14, and device 18 is recessed into frame 16. First and second transformer core portions 24,22 are sized and dimensioned to fit within the respective components of the frame 16 or door 14. Further, first and second transformer core portion 24, 22 are located so as to be aligned and in close proximity for proper operation when door 14 is latched into frame 16. That is, first and second transformer core portions 24, 22 are positioned one with respect to the other in at least one position that defines a magnetic circuit, enabling a variable current in either of second coil windings 23a, 23b or first coil windings 25a, 25b to induce a magnetic flux in its respective core half 22a or 24a and thereby inductively create an electric current in the other coil 23a, 23b or 25a,25b. Additionally, device 12 may be housed within door 14 with set screws 19 (FIG. 3), which may also be utilized to adjust the depth of penetration of the device 12 into door 14. This adjustment provides yet another means to minimize the air-gap 28.

In a first embodiment, coil winding 25b is a sense winding designed to have fewer windings than coil winding 25a of core half 24a. In a second embodiment, there are windings for power transfer, and transmit and receive, for both door and frame.

In a typical installation, first transformer core portion 24, being mounted in the fixed frame, is connected to an external source of power (not shown) which produces current and voltage inductively in second transformer core portion 22 mounted in door 14; however, it is obvious that power produced in transformer core portion 22, as by a battery (BAT1, FIG. 10) disposed in door 14, can create current and voltage in transformer core portion 24. Thus, data transfer is possible in both directions between door 14 and frame 16.

Referring now to FIGS. 6 through 8, in operation, as door 14 closes within frame 16, protruding ramp 42 engages and rides up the inclined surface of strike plate 62 (FIG. 6). Protruding subassembly 30 slides axially within upper and lower housings 32, 34, compressing spring 46. Further travel in the direction of door closing (FIG. 7) allows protruding ramp 42 to be urged by spring 46 into receiver 58 in device 18, as shown.

When door 14 is in the closed position within the frame 16 device 18 is adapted and aligned to receive the protruding ramp 42 in a fit and manner as to align (FIG. 8) the opposing core halves 24a, 22a of first and second transformer core portions 24, 22 and to minimize air gap 28 there between. This closed door configuration of the transformer enables the transfer of power and data between the door 14 and frame 16 when an alternating current is applied to the frame side transformer core portion 24 by utilizing the circuit present in door 14 in cooperation with door transformer core portion 22 and the circuit present in frame 16.

Note that in all FIGS. 1 through 9, conventional connecting wiring is assumed and is therefore omitted for clarity.

Figure 10:
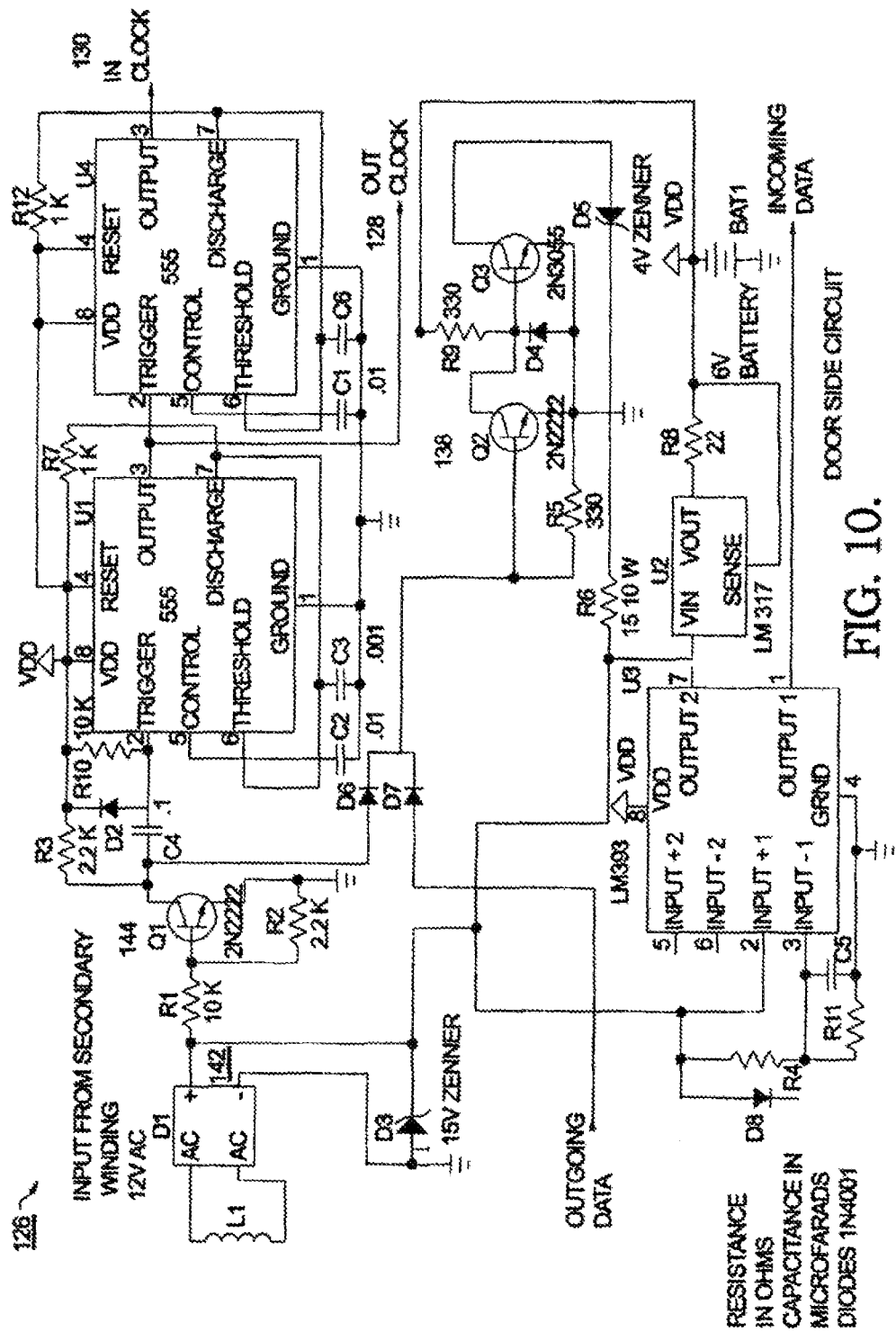
FIG. 10 is a schematic diagram of an exemplary circuit for implementing the door side of the present invention.
Figure 11:
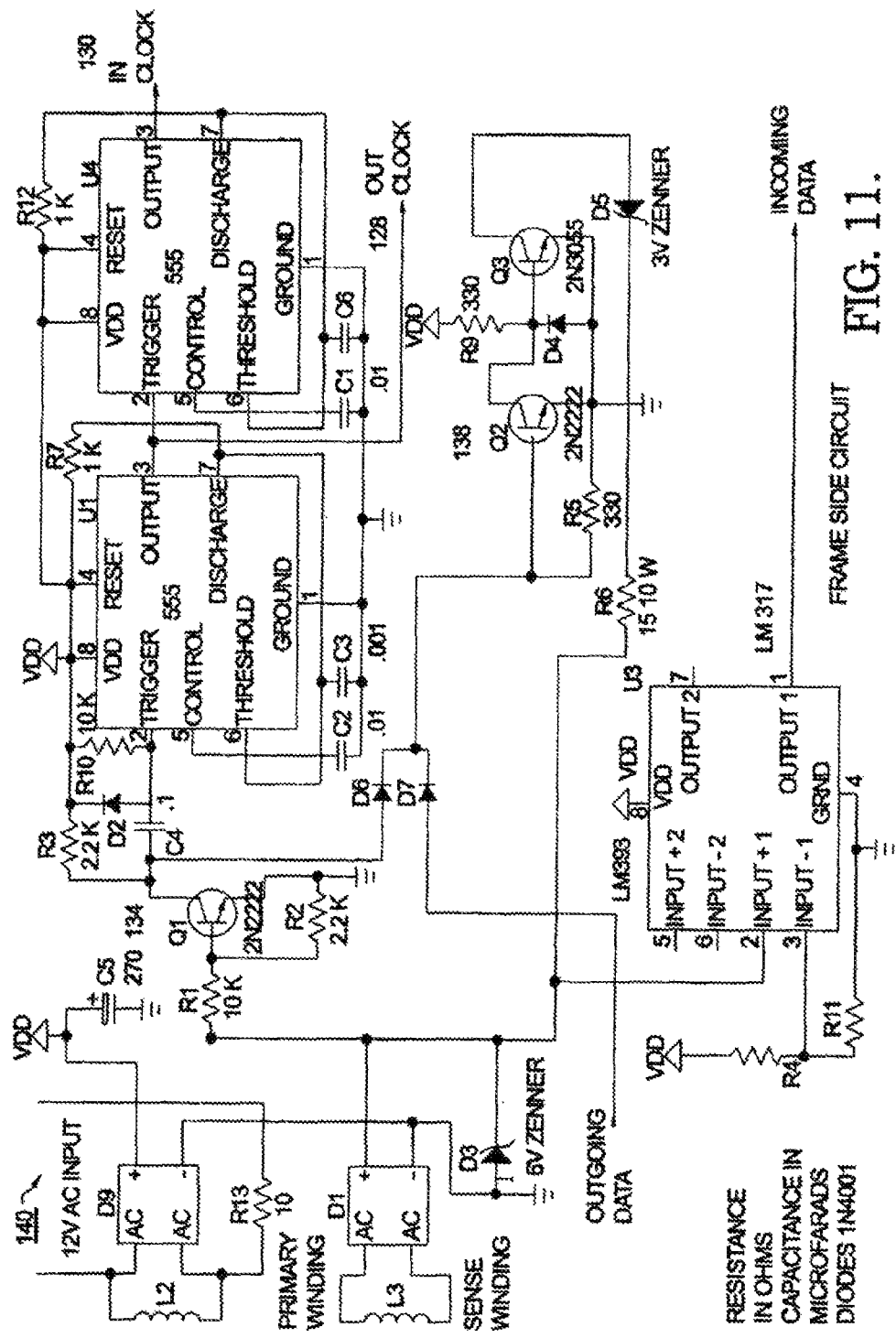
FIG. 11 is a schematic diagram of an exemplary circuit for implementing the frame side of the present invention.
Figure 12:
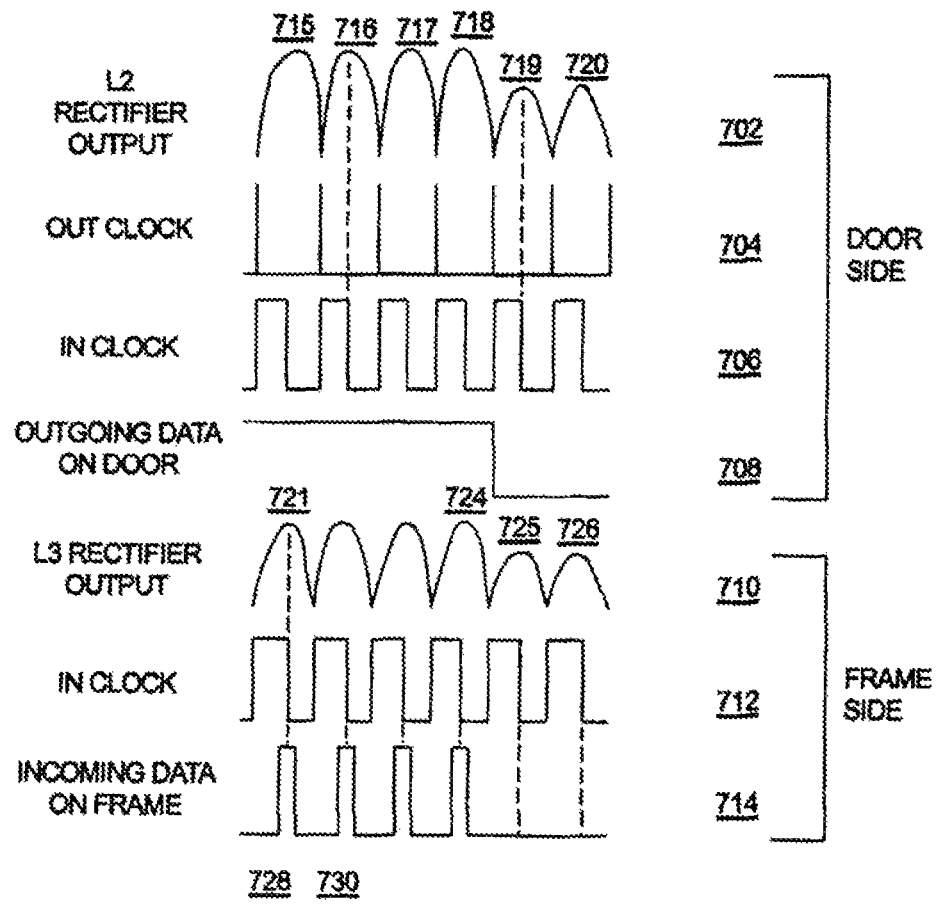
FIG. 12 is an exemplary timing sequence of signals and data transmission between the door and frame in one embodiment of the present invention.

Referring now to FIGS. 10 through 12, the present invention further comprises circuitry of components that are utilized to provide the necessary signaling between door 14 and frame 16 and any remote stations. Some of the circuitry is located on the door and some on the frame.

FIG. 10 is a schematic diagram illustrating an exemplary implementation of a door side circuit 126. The various components of circuit 126 provide the timing sequences 702 through 708, shown in FIG. 12, that enable the receipt of power and the transmission of data between door 14 and frame 16. Circuit 126 comprises, among other components, a secondary winding L1, a bridge rectifier D1, a voltage regulator U2, a comparator U3, a pair of 555 timer integrated circuits U1, U4 and a number of transistors, diodes, capacitors and resistors, all of which enable the receipt of power to charge a battery and/or transfer data to/from the frame side.

Secondary winding L1 represents the core windings 23a, 23b of door transformer 22. In operation, the secondary winding L1, which is powered through conventional transformer operations, receives an input voltage of approximately 12 Volts AC to provide a sine wave at a frequency of between 60 and 60,000 Hertz. The secondary winding L1 is in electrical connection with bridge rectifier D1. Bridge rectifier D1 converts the sine wave to a full wave rectified signal 142, as shown in sequence 702. In order to prevent fly back voltage across L1, zener diode Z3 is located in parallel across the output terminals of the rectifier D1. The full wave rectified signal 142 is applied to the voltage regulator U2, the base of transistor Q1 and to an input comparator U3.

The rectified signal 142 applied at regulator U2 provides the necessary voltage $V_{out}$ to charge a built-in battery such as BAT1. As illustrated in the circuit 126, the built in battery is charged through a resistor R8. A voltage regulator such as LM 317, available from National Semiconductor Corp., Santa Clara, Calif., meets the necessary specifications to support the configuration of this embodiment of the present invention.

Rectified signal 142 applied to the base of transistor Q1, which has its conduction path (collector to emitter in the case of a Bipolar Junction Transistor (BJT)) reverse-active, provides an inverter function. The rectified signal 142 is applied to Q1 across a voltage divider of R1, R2 to provide inverted signal 144. The inverted signal 144 is applied through resistor R10 and capacitor C4 to edge-detect the pulse of the signal and apply a negative going trigger to the timer U1.

Timer U1 is adapted to operate in the monostable mode and thereby function as a "one-shot". By manipulating an RC network circuit signal to the threshold and reset inputs of the timer U1, the interval for the pulse of the timer U1 output may be adjusted. In a currently preferred embodiment of the present invention, capacitor C3 and resistor R7 are selected to set the timing interval for the one shot to be approximately one micro second (1 μSec).

Time interval T=RC ln(3) where R=1K ohm and C=0.001 μFarad.

The resulting output signal of the timer U1 is shown in sequence 704. The output signal of timer U1 is used to provide a clock signal—Out Clock 128, for an outgoing data shift register (not shown). The data shift register would contain any output data from door 14 that is required to be transmitted to the frame 16 and beyond to other remote units or devices.

The output clock signal of timer U1 is also used to trigger a second one shot timer U4, which in turn provides a clock signal, In clock 130 shown in sequence 706. In clock 130 is utilized for clocking incoming data to the door side. More specifically, In clock 130 is utilized to move a detected data stream in a data received shift register (not shown). Capacitor C6 and resistor R12, determine the timing interval/pulse duration for timer U4.

The full wave rectified signal 142 is further applied to voltage comparator U3. In the presently preferred embodiment of the invention, comparator U3 is an LM 393 comparator, available from National Semiconductor Corp. that provides support for dual voltage offset comparisons. The rectified signal 142 is applied to non-inverting Input +1 of the comparator U3. The other input to the comparator U3 is a time-averaged slightly attenuated version of the full wave rectified signal 142 and it is applied to inverting Input −1. This scheme maintains tracking for the comparator U3 in the event that the input from the secondary winding L1 rises or decreases for any unforeseen circumstances. Output 1 of the comparator U3 provides a data stream which may then be routed to a data receive shift register (not shown), i.e., a register for holding incoming data to the door 14.

Returning to the transistor Q1, the signal on the collector 144 is OR'ed with the output stream, shown in sequence 708, from the outgoing shift register (not shown), using diodes D6, D7. The combination of the two signals is applied to transistor Q2, the output of which i.e. collector 138 is then applied to the base of transistor Q3. The collector of transistor Q3 provides a signal that is used to lower individual half cycles of the full wave rectified signal 142 emanating from the bridge rectifier D1 through zener diode D5 and resistor R6, which in effect lowers the impedance seen by the secondary winding L1 on door 14.

Having described the circuitry and the associated timing sequences that enable power transfer and data communication on door 14, attention is directed next to the frame side circuitry and related timing sequences.

FIG. 11 illustrates a schematic circuit diagram 140 of an exemplary implementation of a circuit for the frame side of the present invention. The various components of the circuit 140 provide the timing sequences 710 through 714 shown in FIG. 12. Circuit 140 comprises among other components a primary winding L2 and a sense winding L3 of transformer windings 25a, 25b, a bridge rectifier D9, a comparator U3, a pair of 555 timer integrated circuits U1,U4 and a number of transistors, diodes, capacitors and resistors, all of which enable the transfer of power and communication to/from door 14.

In operation, a 12 Volt alternating current source is electrically connected and applied to the primary winding L2 of the second transformer 24 through resistor R13. Primary winding L2 in the circuit 140 represents the coil windings 25a, 25b. Resistor R13 serves to limit the current applied to the primary winding L2 when the two transformers 22, 24 are separated, i.e., when door 14 is in an open position. The 12 Volt alternating current source is also applied to bridge rectifier D9. The output of the rectifier D9 is applied to the non-inverting Input +1 of the comparator U3 through zenner diode D3. A reference voltage is divided across resistors R4, R11 and applied to the inverting Input −1 of the comparator U3. This configuration with the reference voltage enables variations in input voltage applied to Input +1 to be tracked at the Output 1 of the comparator U3.

The sense winding L3 is powered through conventional transformer operations via the primary winding on the frame side, i.e., L3 has an induced current and ultimately voltage, determined by the primary winding on the frame 16 and the ratio between L3 and L2. Sense winding L3 captures the modulated alternating current signal from the primary side of the transformer. In effect, a sine wave is produced across L3 on frame 16 side by virtue of the sine wave present on the primary winding, L2 as earlier described. As a result, sense winding L3 may provide detection of the open or closed condition of door 14. In other words, when the door is open, i.e. transformers 22, 24 are not aligned, there is significantly reduced voltage across the sense winding L3, since the magnetic field is no longer complete. A symbiotic relationship between the door and the frame is created by the interdependent coil scheme of the present invention. Sense winding L3 can also be used to affect the signal present on the door side of the split transformer arrangement.

On the frame side, the sine wave from winding L3 is provided to the bridge rectifier D1. Rectifier D1 converts said sine wave to a full wave rectified signal as shown in sequence 710. The resulting full wave rectified signal is applied to the base of transistor Q1 through resistor R1, resulting in an inverted signal at the collector of Q1. This inverted signal is applied to capacitor C4 and resistor R10, which serve to edge detect the pulse and apply a negative going trigger to the one shot circuit of the 555 timer U1.

Similar to the previous discussion respecting the door side circuitry, capacitor C3 and resistor R7 set the timing interval for the one shot at approximately one microsecond. The resulting output signal of timer U1 is used to provide a frame side out-clock signal 128 for the outgoing data shift register (not shown) containing output data to be transmitted across the power and data link of door 14 and frame 16. The clock signal 128 is then used to trigger the next one shot 555 timer U4, which in turn provides an in-clock signal 130 for the incoming data to frame 16. The pulse duration of the in-clock signal 130 is set by capacitor C6 and resistor R12. In the preferred embodiment of the present invention, the pulse duration is approximately four milliseconds in length.

The third electrical connection of the full wave rectified signal of sequence 710 is applied to the non-inverting input +1 of the comparator U3. The other input to the comparator U3, i.e., inverting input −1, may be filtered by a capacitor such as is shown on the door side, or merely just voltage divided by resistors R4 and R11 as shown in circuit 140. The output of comparator U3 provides a data stream that may be routed to the data receive shift register (not shown) for the frame side. An exemplary output of the comparator is shown in timing sequence 714.

The signal on collector 134 of transistor Q1, i.e., the inverted signal of sequence 710, is OR'ed with the outgoing data stream (sequence 708) from the outgoing data shift register (not shown) using diodes D6, D7. The combination of the two signals i.e. inverted sequence 710 and sequence 708, is applied to transistor Q2. The output of Q2 is then applied to the base of transistor Q3. The collector of transistor Q3 provides a signal that is used to lower individual half cycles of the full wave rectified signal emanating from the bridge rectifier D1 through zener diode D5 and resistor R6, which in effect lowers the impedance seen by the sense winding L3. The zener diode Z3 prevents a fly back voltage across L2 and L3.

A communication protocol is provided to ensure that only one side of the door-frame interface is communicating at any given time. The timing sequence of FIG. 12 particularly illustrates the inventive data rate feature of the present invention. Specifically, the rectified output signal on the frame side is shown in sequence 702. As shown, the sequence 702 comprises a number of full voltage half cycles 715-718 and reduced voltage half cycles 719-720. When the rectified signal 146 is applied to the rest of the circuit 140 as described earlier, the outgoing data signal shown in sequence 708 is produced. Sequence 708 illustrates a high signal or "1" for the four half cycles 715-718 and low signal—"0" for the next two half cycles 719,720.

The sensing winding L3 in accordance with described circuit 140, receives a smaller amplitude wave form, shown in sequence 710. Notably, the frequency and cycles of sequence 710 are consistent with those of sequence 702, from the rectifier D1.

The incoming data sequence 714 on the frame side is a sequence of pulses occurring and centered on the peak amplitude of the sense winding L3 rectifier output 146 that is shown in sequence 710. Notably, a pulse representing a "1" occurs for each full half cycle wave 721-724 of the frame side sense winding sequence 710. A "0" or no pulse is present for each non full half cycle wave 725, 726. More significantly, the incoming signal of sequence 714, which is on the frame side, is consistent with the outgoing signal of sequence 708 from the door side. Furthermore, the data rate of the incoming signals of sequence 714 is essentially twice the frequency of the sinusoidal wave which was originally induced from the door winding L1 to the sense winding L3 of the frame. This aspect is manifest by comparison of the timing sequences 702, 710 and 714, wherein there are two data signals in 714 for the two half waves 715, 716 and 721, 722 which represent a single period of the sinusoidal waveform provided between windings L1 and L3.

In a second embodiment of the present invention three winding sets L4, L5, L6 are utilized in each of the door and frame side circuits to provide power and data transmission. Winding set L4, is utilized to transmit data from the door to the frame side; winding set L5 is utilized to provide power between the frame and door sides; and winding set L6 is utilized to transmit data from the frame to the door side. Similar to the first described embodiment of the present invention, this alternate embodiment employs a power transfer portion that can resonate both a frame primary winding L5a and a door secondary winding L5b portion of the winding set L5 to permit some displacement between core halves. Differently however, two 'data-only' winding sets L4, L6 are incorporated into this design. L4, L6 comprise primary and secondary coils on each of the frame and door halves to provide isolated input and output circuits for transmitting and receiving data in either direction. Preferably, data flows in one direction on one of the winding sets and the other direction on the other of the winding sets. The second embodiment of the present invention is best described with reference to FIGS. 13-15.

Figure 13:
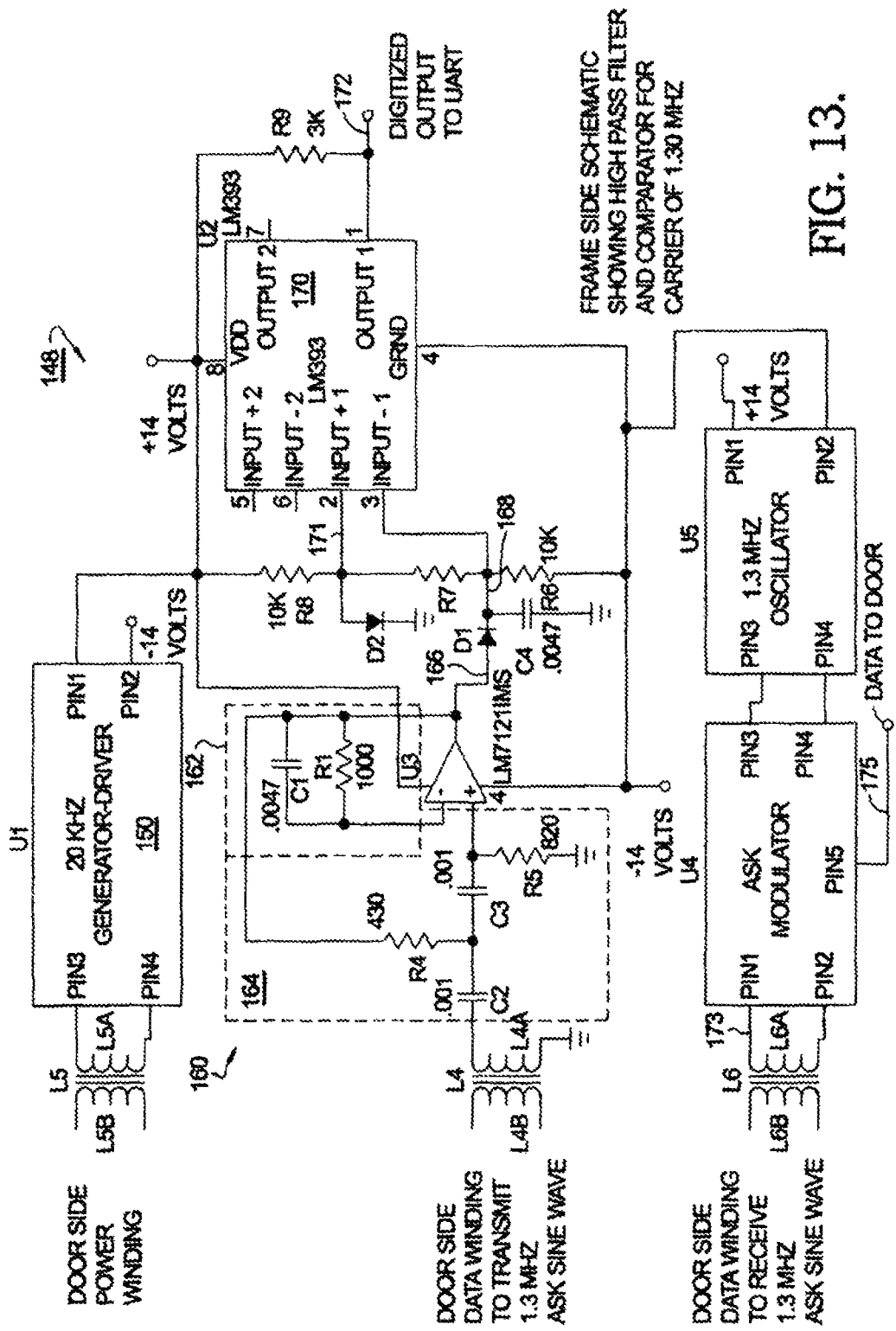
FIG. 13 is a schematic diagram of an alternate embodiment of an exemplary circuit for implementing the frame side of the present invention to support bi-directional high speed data communications.

FIG. 13 provides an illustrative schematic diagram of a circuit 148 that may be implemented on the frame side of the alternate embodiment of the present invention. Circuit 148 comprises power winding set L5 connected to a 20 KHz generator driver 150. The generator 150 drives the primary coil L5a of the power winding set L5 in order to provide power from the frame side to the door side. A more detailed view of the generator is illustrated in FIG. 14.

Figure 14:
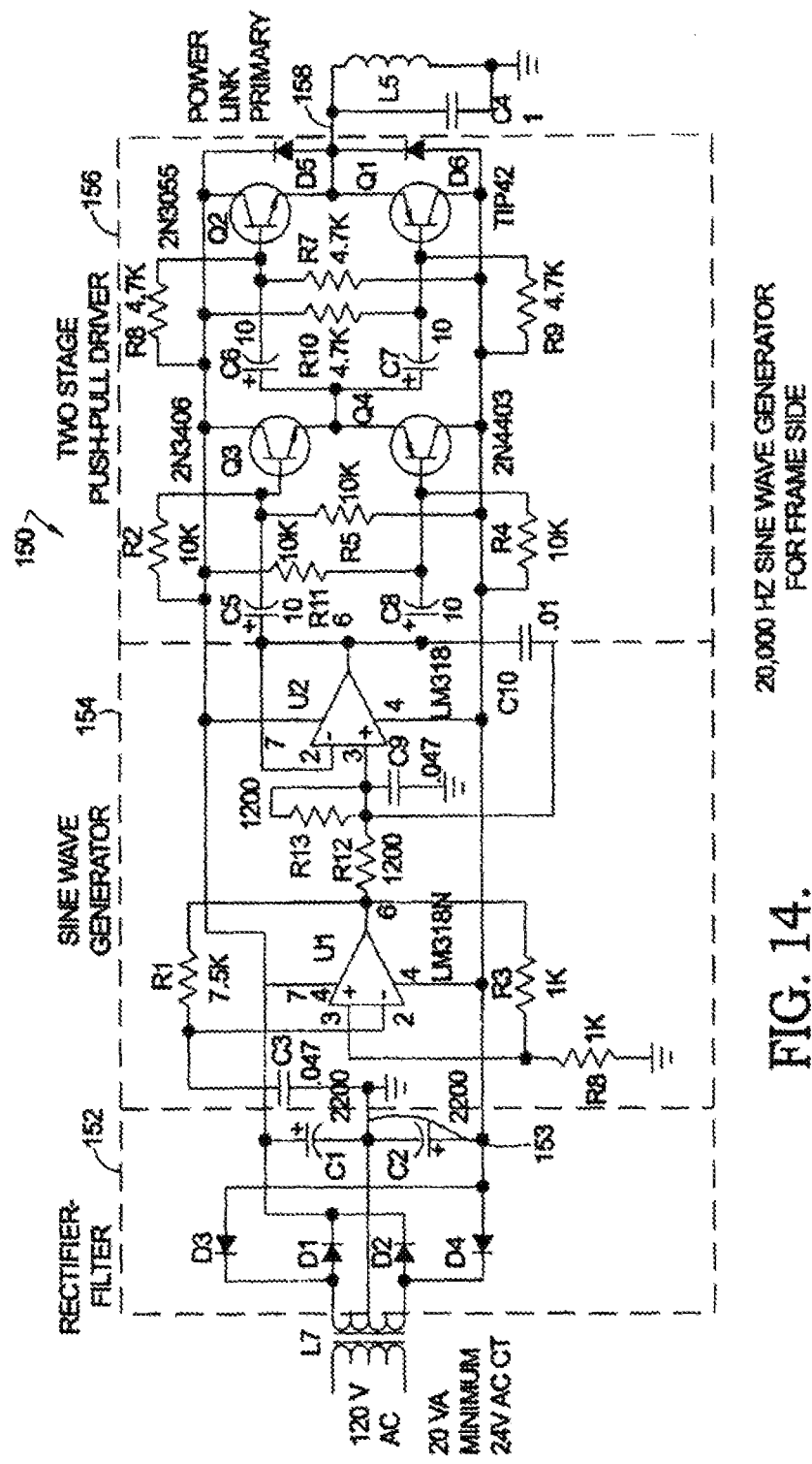
FIG. 14 is a schematic diagram of an exemplary 20 KHz sine wave generator for providing power from the frame sided of FIG. 13 in the present invention.

As shown in FIG. 14, the generator 150 generally comprises a rectifier-filter 152, a sine wave oscillator 154 and a two stage push-pull driver 156. The generator driver 150 is utilized to provide frequencies in the high audible range or above, so that a person with a normal hearing range or frequency would not be disturbed by the sounds emanating from the device. A traditional power supply source of 120 VAC is applied to a center tapped transformer L7 to provide 24 VAC. The output of the transformer L7 is rectified utilizing diodes D1, D2, D3, D4 and then filtered by capacitors C1, C2. The filtered signal powers the dual op amp sine wave oscillator 154. Sine wave Oscillator 154 comprises dual operational amplifiers U1, U2.

The sine wave oscillator 154 generates a sine wave by first generating a square wave, at the required frequency, utilizing amplifier U1 which is configured as an astable oscillator with a frequency that is determined by R1 and C3. Amplifier U2 provides a low pass filter that filters the square wave output from U1. The filter U2 is configured to have a cut off frequency equal to the square wave frequency from U1 and thus provides a sine wave at a frequency determined by the associated circuit component resistors and capacitors. In this embodiment, the desired frequency of 20,000 Hz is attained by providing a capacitor C3 having a value of 0.0047 μfd and based on these values, the values of components R1, C9,C10 and R12 are then calculated. The relevant equations for the component selection may be described as follows:

$$C9=C3$$

$$C10=2C1$$

$$R1=\tfrac{1}{2}F/(0.693*C1)$$

$$R12=1/(8.8856*F*C1)$$

$$R13=R12$$

Accordingly, the following exemplary values which are also shown in the circuit 148 are determined to be as follows:

$$C9=C3=0.0047\ \mu fds$$

$$C10=2C1=0.01\ \mu fds$$

$$R1=\tfrac{1}{2}F/(0.693*C1)=7.5\ KOhms$$

$$R12=1/(8.8856*F*C1)=1200\ Ohms$$

$$R13=R12=1200\ Ohms$$

Resistors R3 and R6 are selected to be 1K Ohms each and are matched in value to help minimize errors in the actual frequency of operation. The frequency F is the required sine wave frequency −20,000 Hz. The value for C1 is selected arbitrarily, with a value of 0.0047 µfd being a good initial value for 20 KHz.

The output of the sine wave generator 154 is connected to the two-stage push-pull driver 156 in a dual rail through capacitors C5, C8. The output 158 of the two stage push-pull driver is connected to the primary winding L5a and capacitor C4 in parallel to cause resonance at 20 KHz. This provides power from the frame side to the door side. The generator 150 is essentially a dual rail system that is capable of providing approximately 28 volt peak to peak signal to the primary winding L5a of the power link split core transformer 20.

Returning to the schematic diagram of FIG. 13, that is, the frame side circuit, a coil winding set L4 enables communication to be received on the frame side from the door side. As illustrated, the door side would provide a 1.3 Mhz carrier modulated by an Amplitude Shift Keying (ASK) signal to coil L4b. The induced modulated signal is picked up by coil L4a and passed through a third order high pass filter 160. The third order filter 160 removes the 20 KHz power signal which may be several times stronger than the modulated carrier.

Third order high pass filter 160, comprises an inverting first order filter 162 coupled with a non-inverting second order filter 164. The first order filter 162 is comprised of resistor R1 and capacitor C1. The second order filter 164 comprises capacitors C2, C3 and resistors R4, R5. The output 166 of the high pass filter 160 is applied to a rectifier diode D1 and filter capacitor C4 to convert a group of positive going half cycles to a single positive pulse. In operation, each positive pulse from the rectifier is an accumulation of approximately twelve half cycles of the carrier signal of 1.3 Mhz. In effect, this yields a maximum data rate on the order of approximately 100 KB, which is determined as follows:

$$1300000/12=108333.333\ bps$$

The rectified and filtered signal 168 is then applied to the negative input of a comparator 170. A sliding threshold signal 171 is applied to the positive input of the comparator 170. Comparator 170 may be a device such as an LM393 made by National Semiconductor of Santa Clara, Calif. The output 172 of the comparator 170 may then be supplied directly to a serial input data conversion device such as a Universal Asynchronous Receiver Transmitter (UART). The UART provides conversion of the serial stream to a parallel data stream for use by other devices.

The transmission of data from the frame side to the door side is accomplished by utilizing a carrier frequency which is provided by the oscillator U5. Oscillator U5 provides a 1.3 Mhz carrier signal that is connected to ASK modulator U4. Data 175 that is to be transmitted is then applied to the modulator U4 to provide an output signal 173. Output signal 173 is applied across coil L6a to induce a current in coil L6b on the door side where the data 175 may the parsed and utilized.

Figure 15:
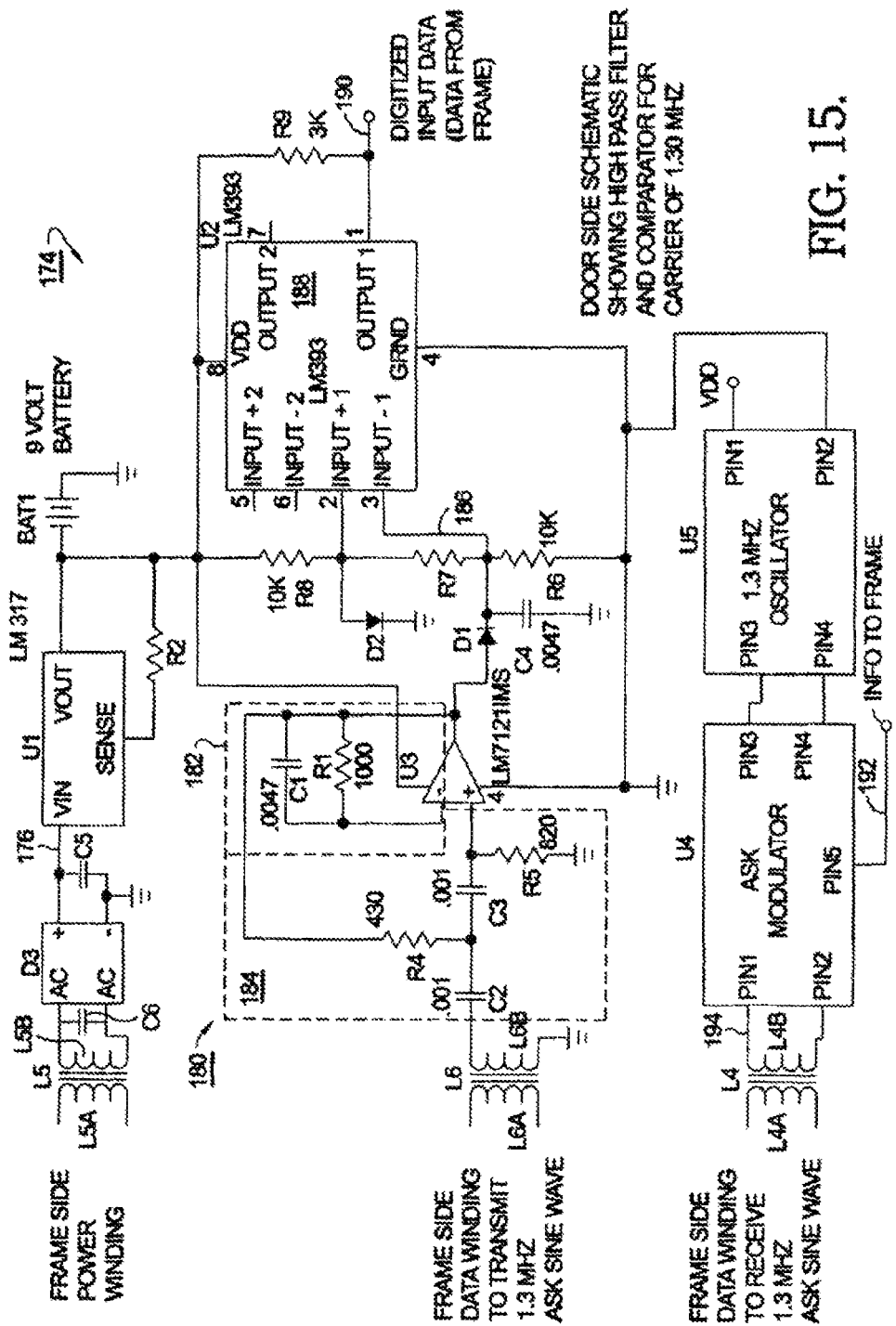
FIG. 15 is a schematic diagram of an alternate embodiment of an exemplary circuit for implementing the door side of the present invention to support bi-directional high speed data communications.

Turning next to the door side of the second embodiment of the present invention, FIG. 15 provides an illustrative schematic diagram of a circuit 174 as implemented on the door side of this alternate embodiment. Similar to the frame side, circuit 174 comprises power winding set L5 and data windings L4, L6.

Power from the frame side is provided through primary winding L5a and induces a current in secondary winding L5b. Capacitor C6 is in parallel with secondary winding 5b to cause resonance. The secondary winding L5b is in electrical connection with bridge rectifier D3. Bridge rectifier D3 converts the received sine wave to a full wave rectified signal 176. A filter capacitor C5 is located in parallel across the output terminals of the rectifier D1. The full wave rectified and filtered signal 176 is applied to a voltage regulator U1.

The regulator U1 provides the necessary voltage $V_{out}$ to charge a built-in battery BAT1 and provide power to the door side circuit 174. A voltage regulator such as LM 317, available from National Semiconductor Corp., Santa Clara, Calif., meets the necessary specifications to support the configuration of this embodiment of the present invention.

The power winding set L6 enables communication that originates on the frame side to be received on the door side. The frame side produces a 1.3 Mhz ASK sine wave in coil L6a, which in turn induces a current in coil L6b on the door side. The induced modulated signal is then passed through a third order high pass filter 180 (FIG. 15).

Similar to the frame side, the Third order high pass filter 180, comprises an inverting first order filter 182 coupled with a non-inverting second order filter 184 to produce a rectified and filtered signal 186. The rectified and filtered signal 186 is then applied to a rectifier diode D1 and filter capacitor C4, and then to the negative input of a comparator 188. Comparator 188 may be a device such as an LM393 made by National Semiconductor of Santa Clara, Calif. The output 190 of the comparator 188 represents digitized data received from the frame side.

Winding set L4 as previously described, enables communication to be received on the frame side from the door side. As illustrated, the door side would provide a 1.3 Mhz carrier utilizing the oscillator U5, the output of which is modulated by an Amplitude Shift Keying (ASK) modulator U4. Modulator U4 receives outgoing data 192. Outgoing data 192 is information that is present on the door side for transmission to the frame side. A modulated signal 194 comprising the outgoing data 192 is provided at coil L4b. Through induction, the modulated signal 194 is picked up by coil L4a on the frame side where the data can be extracted as described above relative to the signal that is picked up by coil L6b on the door side.

In a further aspect of the present invention, identical carrier frequencies may be utilized to transmit data in both directions such that both receivers would output the same data for transmission in either direction. In an even further aspect, different frequencies, which are separated by a sufficient amount to allow the use of band pass filters for distinguishing between power frequency of door or frame transmitters may be utilized. A resulting reduced data rate may occur in this instance due to bandwidth limitations.

While protruding assembly 12 and receiver assembly 18 have been described herein as separate assemblies, it is contemplated by this invention that the protruding assembly may be made part of and combined with a conventional door latch bolt assembly and the receiver assembly may be made part of and combined with a conventional strike assembly.

Figure 16:
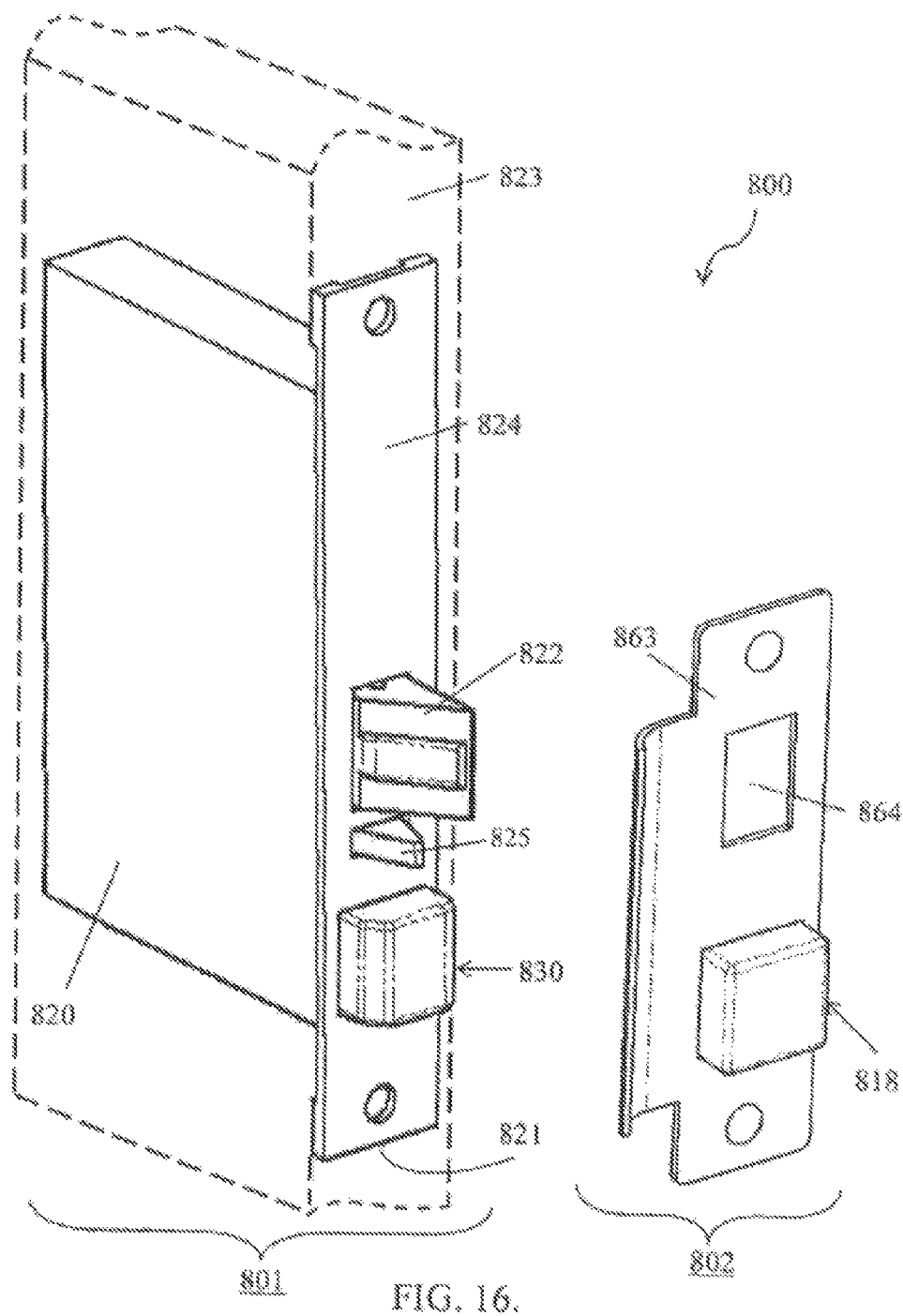
FIG. 16 is a perspective view of a lock body and strike plate of an additional embodiment of the present invention.
Figure 17:
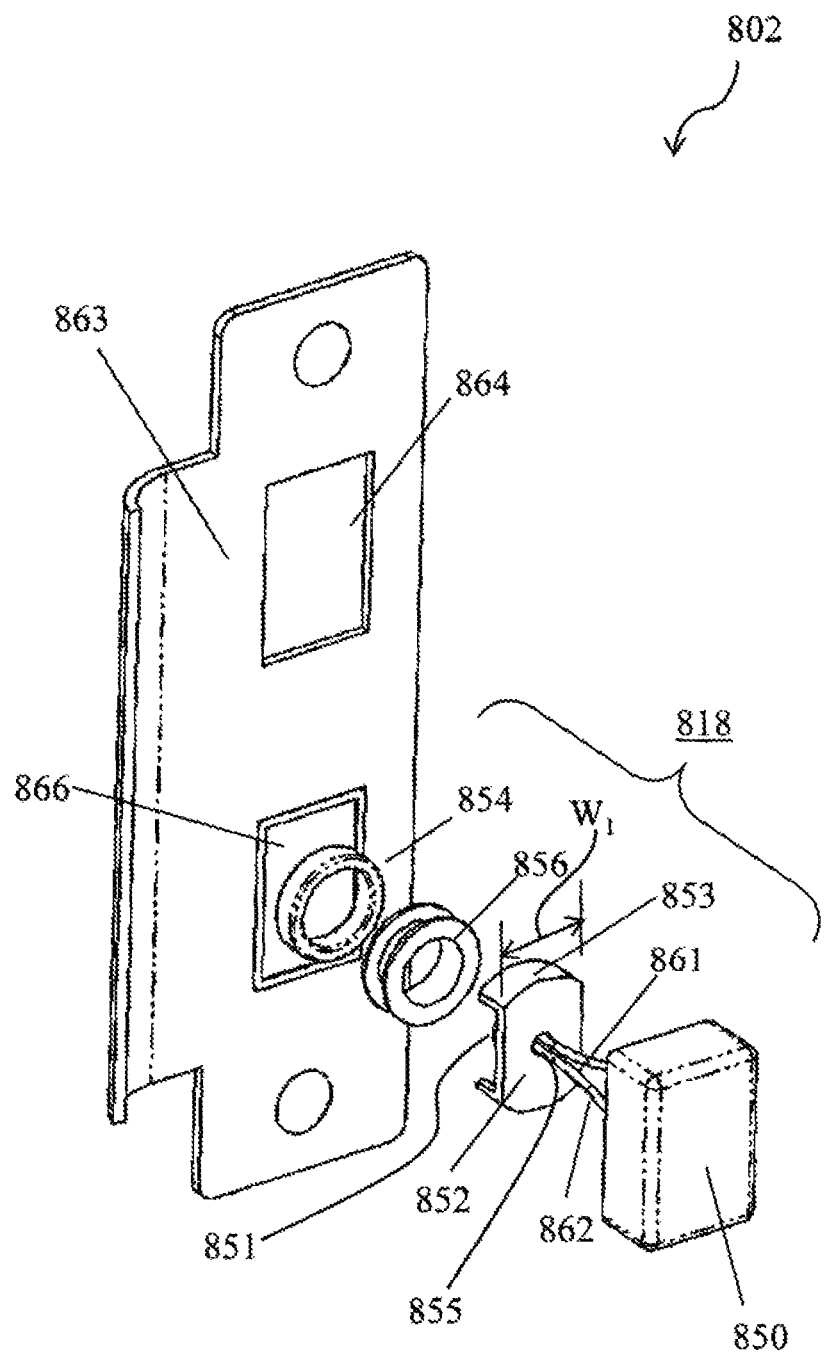
FIG. 17 is an exploded view of the strike plate of the embodiment of FIG. 16.
Figure 18:
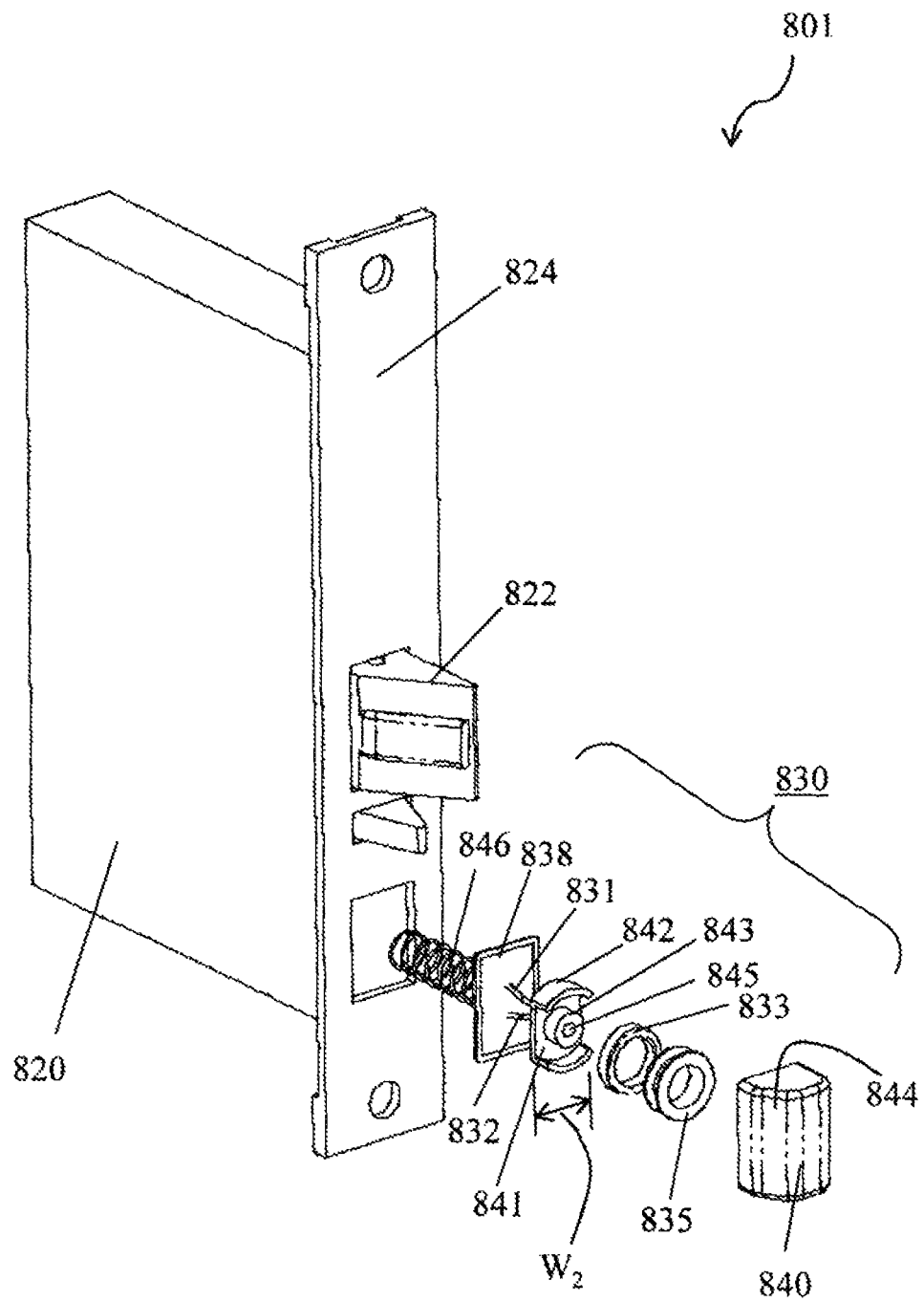
FIG. 18 is an exploded view of the lock body of the embodiment of FIG. 16.

Referring to FIG. 16 through 18, an alternative embodiment of an inductively coupled power transfer entry device system is generally indicated by reference numeral 800. In a preferred embodiment, entry device system 800 is substantially a mortise lock set having a door unit 801 and a frame unit 802. Door unit 801 comprises a lock body 820 that is inserted within a mortise 821 cut into the edge 823 of a door proportioned so as to create a snug fit between the body and door. Face plate 824 covers any gaps between the body and the face of the door and also protects the internal mechanisms housed with the body. Face plate 824 is generally adapted to fit flush with the edge surface of the door when secured. Lock body 820 is equipped with a door latch 822, a dead latch 825, and a deadbolt slide (now shown). Door latch 822 passes through latch aperture 864 on strike plate 863 and engages within a recess in the door frame so as to secure the door in a closed position. Generally, a handle (not shown) is used to operate a latch mechanism which allows latch 822 to be selectively withdrawn into the lock body and out of the recess, thereby allowing the door to swing open from the door frame. While lock body 820 is further typically equipped with a deadbolt slide and associated mechanism to provide a further structural locking means, the embodiment shown in FIG. 16 replaces the typical deadbolt slide with an inductively coupled power transfer receiver unit (second transformer core portion) 830. Similarly, strike plate 863 of frame unit 802 is equipped with a corresponding inductively coupled power transfer transmitter unit (first transformer core portion) 818 situated proximate the opening typically reserved within the dust box for passage of the deadbolt slide when the deadbolt is engaged. Thus, it is envisioned that mortise locks currently mounted within homes and businesses can be retrofitted with the present embodiment without requiring additional cutting of the door, frame or hardware.

Referring now to FIG. 17, frame unit 802 is generally comprised of a strike plate 863 having apertures 864 and 866. Aperture 864 is sized to accept insertion of a latch 822 (see FIGS. 16 and 18) when strike plate 863 is properly positioned and secured on a frame. In a typical mortise lock set, aperture 866 is sized and positioned so as to accept passage of a deadbolt slide. However, in the presently envisioned embodiment, aperture 866 is equipped with transformer core portion 818 having a front cover (not shown), preferably slightly recessed, and a back cover 850. Positioned between the covers of the transformer core portion is a transformer core half, such as for example pot core half 852, having sides 853 and a central open cylindrical post 851, defining opening 855. Width $W_1$ of core half 852 is sized to fit within opening 866. Coils 854 are wrapped around bobbin 856, with the wound bobbin placed around central post 851 and proportioned to rest within sides 853 of the core half. An electrical current is applied to coils 854 by conventional wiring (not shown) to generate a magnetic field. The core half focuses the strength of the magnetic field while sides 853 provide shielding to reduce electromagnetic interference. When the charged transformer core portion is brought into close proximity to a corresponding uncharged transformer core portion, the magnetic field generated by the charged transformer core portion induces a current within the uncharged transformer core portion. This induced current can then be directed to charge a battery or supply power to selected electronic components, e.g. an electronic key pad. Importantly, the covers and bobbin are fabricated from non-ferromagnetic materials so as to not attenuate the magnetic fields generated by the coil and core.

FIG. 18 provides an exploded view of second transformer core portion 830 used in conjunction with the mortise lock set. Transformer core portion 830 is comprised of a transformer core half, such as for example pot core half 841 having sides 842 and a central cylindrical post 843 defining opening 845. Width $W_2$ of core half 841 is sized to fit within the opening in the lock body typically occupied by a dead bolt slide. Coils 833 are wrapped around bobbin 835, with the wound bobbin positioned so as to be around post 843 and within sides 842. When the door is closed within the frame, coils 833 are induced by the external magnetic field generated by transmitter coils 854 to generate an electric current. The core half focuses the strength of the magnetic field, thereby producing higher current. The induced current can then be used to recharge a battery, power a remote keypad or enable any other feature requiring electrical power. Core half 841, with associated bobbin and coils, is housed between push plate 838 and cover 840. Importantly, bobbin 835 and cover 840 cannot be constructed of ferromagnetic material as this would interfere with the desired reception of the external magnetic field, thereby interfering with electrical current generation. Spring 846 is mounted to the back face of push plate 838 and biases transformer core portion 830 towards the corresponding transformer core portion 818 within frame unit 802 such that cover 850 of the transformer core portion 830 contacts the aperture cover of the transformer core portion 818 when the door is in the closed position. Ramp taper 844 on cover 840 serves to allow cover 840 to ramp into alignment with the slightly recessed cover of transformer core portion 818 when the door is moved to a closed position. Thus, the distance between the two core halves (841 and 852) is always maintained at a controlled, fixed distance when the door is closed. By maintaining a fixed gap, resonance between the transmitter and receiver is optimized thereby allowing for transmission of the maximum amount of energy between the pot cores.

Core halves 852 and 841 as shown and described with reference to FIGS. 16-18 may be of any suitable size and dimension. However, it is envisioned in systems which retrofit or are to be configured to be housed within traditional mortise lock sets, the cores of the core halves are generally configured to have only partial side walls 853 and 842, respectively, so as to fit and freely move within the existing cutouts for the deadbolt slide. The deadbolt cutout is generally about three quarters of one inch (¾") wide and about one and one half inches (1½") high. Ideally, the core halves and coils are of the largest size permissible as the larger the size core and coil, the stronger the produced magnetic field at the transmitter and the stronger the current induced at the receiver.

It is understood that various configurations of cores may be used such as for examples, U-shaped core halves, E-shaped core halves, cylindrical shaped core halves and pot core halves. In one aspect of the invention where a pot core configuration is used, a pot core such as Part #18-11-11, available from TSC Ferrite International, Wadsworth, Ill., meets the necessary specifications to support the configuration of this embodiment of the present invention.

A further embodiment of an inductively coupled power transfer entry device system as shown in FIGS. 16 through 18 includes provision of light pipes or fiber optic cables situated within opening 845 of core half 841 of transformer core portion 830, and within opening 855 of pot core half 852 of transformer core portion 818 so as to provide for data communication between door unit 801 and frame unit 802. Ideally, the fiber optic cable within core half 841 is a bundle of individually clad fibers arranged in coaxial orientation to form a single cable such that receiving fibers 831 are centrally located within the cable's core, with emitting fibers 832 arranged circumferentially around the core to create a general bull's eye pattern of optic fibers. Conversely, the fiber optic cable within core half 852 may be arranged as a coaxial bundle of individually clad fibers with the emitting fibers 862 situated at the cable's core and the receiving fibers 861 arranged circumferentially around the emitting fibers. (See FIG. 19 and relevant discussion thereof, below). Cover 840 of transformer core portion 830 and the front cover of transformer core portion 818 are transparent so as not to impede transmission of light signals from emitting fibers 832 and 862. As shown in FIG. 20, light signals 895 are transmitted from one unit and received by the second unit. While shown as one-way communication, it is to be understood that each core half can transmit and receive light signals from the opposing core half. Note that, in one aspect of the invention, the particular core and cladding materials of the fibers may be selected to provide a particular Numerical Aperture (NA) of approximately 0.6. An NA of approximately 0.6 will provide light rays that may be accepted from light sources and light rays transmitted by the fiber in a cone having an included angle of approximately 60° about the axis of the fiber. This permits the ends of the mating fibers to be misaligned somewhat and still capture the emitted light.

Communication between door unit 801 and frame unit 802 may be for the purpose of exchanging information regarding such things as lock status or the keyed or inputted entry data provided at the lock, or to enable the reconfiguration of an electric lock with a new combination. In one example, an infrequently used character may be periodically transmitted from the door to the frame to indicate that the door is closed. If the character fails to arrive at the frame within a specified period of time, an alarm is sent to a host or system administrator advising an insecure status. The fiber optic cables provide the ability to transmit data at a rate of up to 100 K Baud between the frame and the door.

Figure 19:
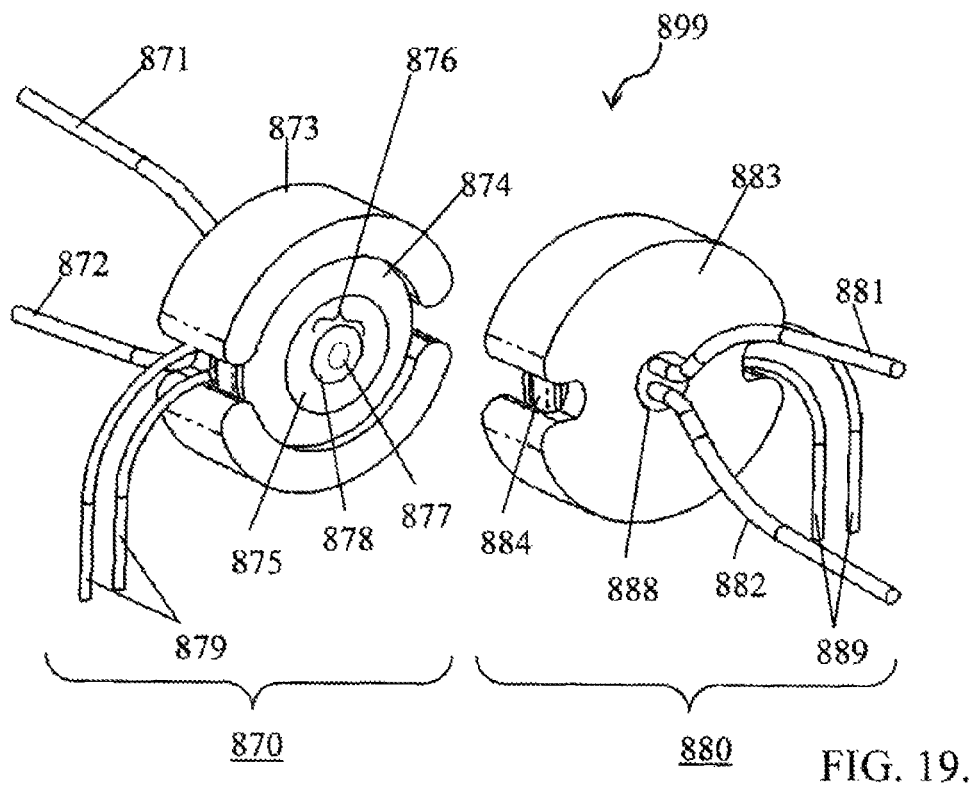
FIG. 19 is a detailed perspective view of a pair of transformer core portions with optional fiber optic cables of yet a further embodiment of the present invention.
Figure 20:
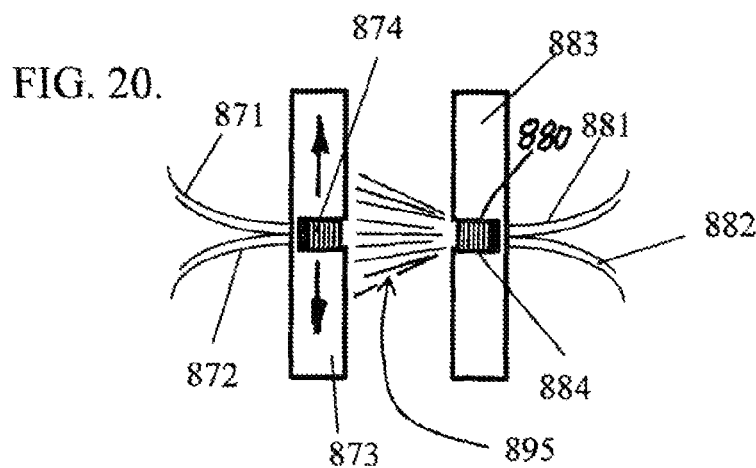
FIG. 20 is a side view of a pair of transformer core portions with fiber optic communication therebetween.

In FIG. 19, a further embodiment of an inductively coupled power transfer entry device system is indicated generally by reference numeral 899. Entry device system 899 is generally comprised of a first transformer core portion 870 to be housed within a door and a corresponding second transformer core portion 880 to be housed within a frame. Each of transformer core portions 870 and 880 are fixedly mounted to its respective door or door frame, with the gap between the units defined by the gap between the door and the frame. Thus, while the individual gap is fixed and defined between a particular door and its particular frame, the gap distance may vary for one door/frame unit to the next. As the gap between the door and frame (and the associated core portions housed in each) is considerably greater than when using a spring-based system which biases one transformer core portion into near contact with its corresponding counterpart, the paired resonating circuits of the fixed transformer core portions are off-tuned so as to yield a more constant output level over the wider gap space. This off-tuning of the resonant circuitry is discussed in more detail below, with reference to FIGS. 24 and 25.

Similarly to the modified transformer core portions described above with reference to FIGS. 16-18, each of transformer core portions 870 and 880 is comprised of a core half, such as for example pot core halves 873 and 883, respectively, having a side wall and an internally open cylindrical post 875. Housed between the side wall and post is a bobbin (874 and 884, respectively) wound with coils. Electrical current is supplied to the set of coils wrapped around bobbin 884 by the circuit including electrical connection 889. The supplied current generates a magnetic field emanating from the coils on bobbin 884. If, and when, transformer core portion 870 is sufficiently within the magnetic field generated by transformer core portion 880, an induced electrical current is generated by the coils wound around bobbin 874. This induced electrical current is then transferred to any desired electrical device by electrical connection 879. Examples of a desired electrical device include, but are not limited to, an electric lock or electric key pad.

Ideally, each transformer core portion 870 and 880 will have an external width less than one inch (1") as current fire codes for fire door applications restrict bore hole sizes to one inch or less. A pot core such as Part #22-13-00, available from TSC Ferrite International, Wadsworth, Ill., meets the necessary specifications to support the configuration of this embodiment of the present invention.

Similarly as described above with reference to the transformer core portions in FIGS. 16-18, the transformer core portions of the embodiment shown in FIG. 19 may each further incorporate a fiber optic cable, e.g. reference numeral 876 within the core's open internal cylinder. The fiber optic cable within core 873 of first transformer core portion 870 is comprised of a bundle of individually clad fibers arranged in coaxial orientation to form a single cable such that receiving fibers 871 are centrally located within the cable's inner core 877, with emitting fibers 872 arranged circumferentially around the core to create a general bull's eye pattern of optic fibers with the receiving fibers located at core 877 and the emitting fibers forming a circular region 878 thereabout. Conversely, second transformer core portion 880 is equipped with a fiber optic cable within its respective core 883 comprising emitting fibers 882 and receiving fibers 881. Complementary to the arrangement of fibers in transformer core portion 870, the emitting fibers of transformer core portion 880 are individually clad fibers situated at the cable's core while the receiving fibers are individually clad fibers arranged circumferentially around the emitting fibers in a coaxial orientation. With this arrangement, two-way communication between the frame and door is conducted as light signals are transmitted from one transformer core portion and received by the other transformer core portion. Communication between first transformer core portion 870 and second transformer core portion 880 may be for the purpose of exchanging information regarding such things as lock status or the keyed or inputted entry data provided at the lock, or to enable the reconfiguration of an electric lock with a new combination. The fiber optic cables provide the ability to transmit data at a rate of up to 100 K Baud between the frame and the door.

As exemplified by the schematic of FIG. 20, light signal 895 is being emitted by the fiber optic cable within second transformer core portion 880. The fiber optic cable is selected to have an NA of 0.60, and the included angle of the emitted light cone of light shown is approximately 60°. As can be seen in FIG. 20, even permitting some degree of axial misalignment between the mating fiber optic cables (shown by the double headed arrow), receiving fiber optic cable 871 remains within the splayed pattern of the emitted light.

In another aspect of the present invention with reference to the embodiments depicted in FIGS. 16-20, circuits are introduced into the door and frame side to maximize the power transfer and bi-directional data transfer across the gap that exists between the transmitting and receiving cores of the present invention.

Referring now to FIGS. 21 through 24, the present invention further comprises circuitry of components that are utilized to provide the necessary signaling between door unit 830, 870 and frame unit 818, 880. Some of the circuitry is located on or within the door and some on or within the frame.

When the door is in the closed position within the frame power transfer transmitter unit 818 is adapted and aligned to receive the protruding ramp 844 in a fit and manner as to align the opposing pot core transformers and to minimize air gap therebetween. This closed door configuration of the transformers enables the transfer of power and data between the door unit 830, 870 and frame unit 818, 880 when power is applied to the frame side by utilizing circuits that are present in door in cooperation with a frame portion circuit.

Figure 21:
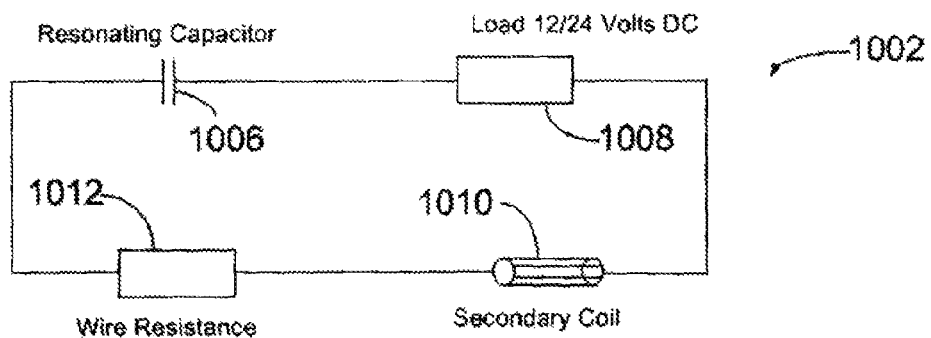
FIG. 21 is a schematic diagram of an exemplary simulation circuit for implementing the power transmission features of the present invention.
Figure 21:
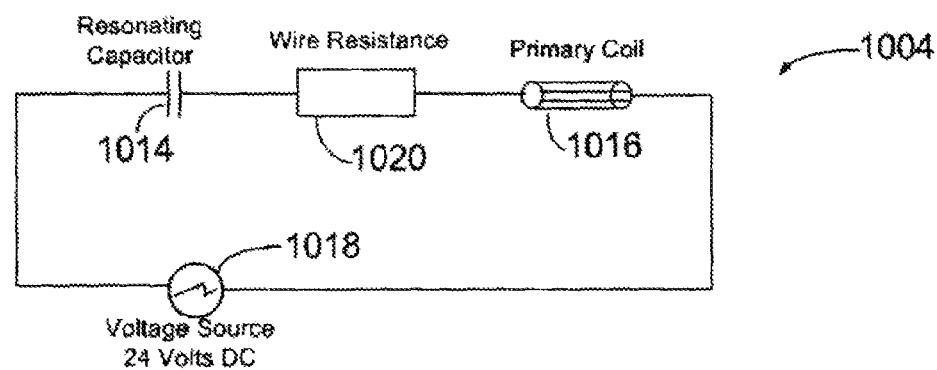

FIG. 21 is a schematic diagram of an exemplary simulation circuit for implementing the power and data transmission features of the present invention. Specifically, circuit 1002 is representative of the door circuitry and circuit 1004 is representative of the frame circuitry. The various components of simulation circuits 1002, 1004 provide recharging of batteries, by power transfer, and importantly provide resonance between the transmitter and receiver to enhance the amount of energy that is transferred between the two. Door circuit 1002 comprises a resonating capacitor 1006, a direct current (DC) load 1008, and secondary coil 1010. The resistance of the wires and other circuit components is represented by wire resistance 1012. Similarly, simulation frame circuit 1004 comprises a resonating capacitor 1014, primary coil 1016, a DC voltage source 1018 and wires/component resistance 1020.

In an embodiment of the present invention, wherein there is a variable gap between the door unit 870 and frame unit 880 (FIGS. 19-20) having a range of between approximately 0.04 to 0.375 inches, the resonant circuits 1002, 1004 are off-tuned to thereby yield a more constant output level across the gap. It should be noted that this embodiment of the invention provides power transmission for charging system batteries along with data transmission between the door and frame across the gap. Frequency tuning of the circuits 1002, 1004 is accomplished by altering the capacitance of each of the respective resonating capacitors 1006, 1014.

Figure 22:
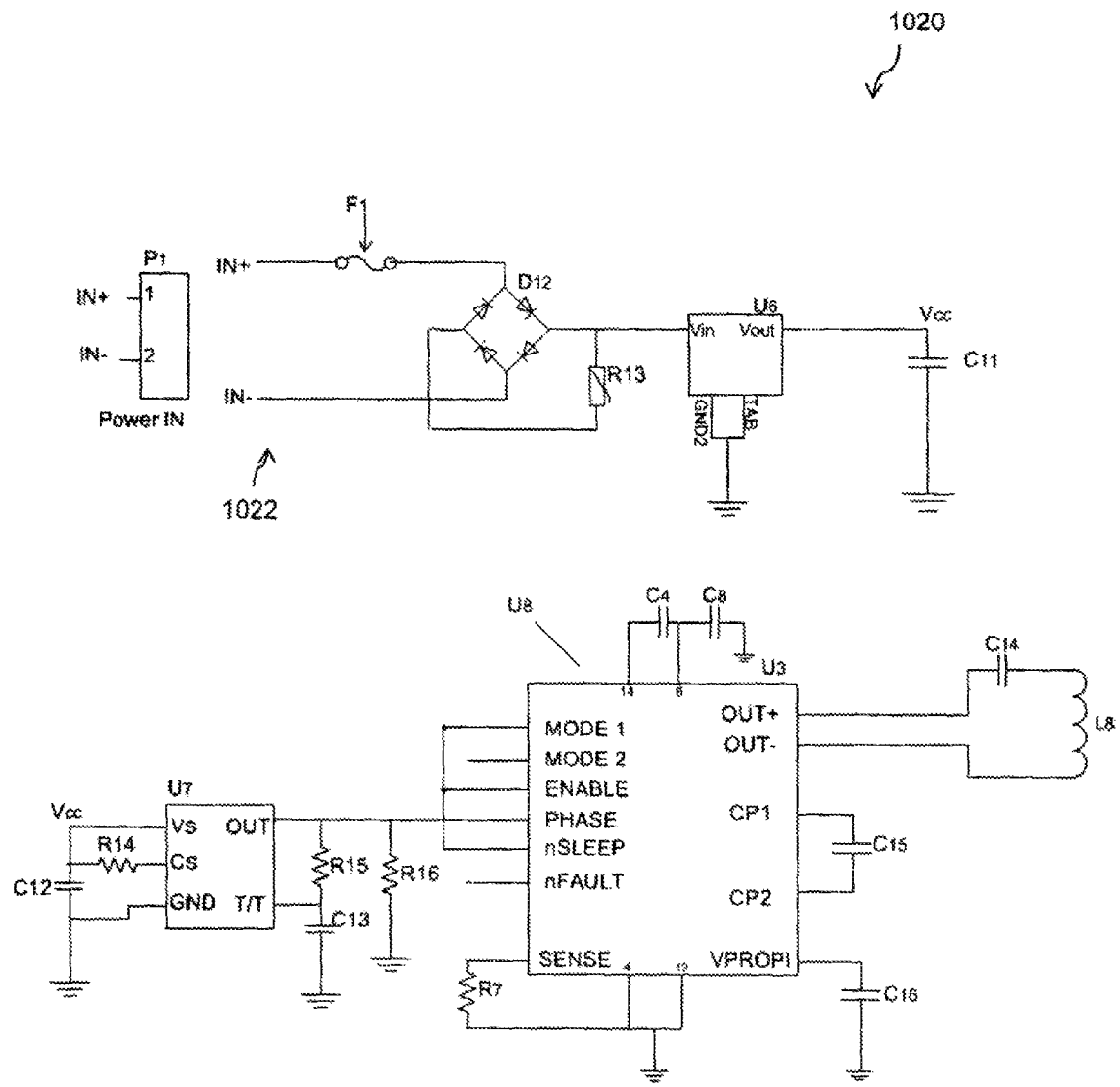
FIG. 22 is a schematic diagram of an exemplary frame side transmitting circuit.

Turning next to FIG. 22, details for an exemplary embodiment of a frame side transmission circuit 1020 is shown. The circuit 1020 comprises among other components a power circuit 1022, a timing oscillator U7, a bridge driver U8, and a coil L8 to convert a 24 volt DC input into a flux signal operating at approximately 100+ KHz.

The power circuit 1022 comprises a power input block P1, a poly fuse F1, a bridge rectifier D12, a transient voltage suppressor R13, a voltage regulator U6 and a decoupling capacitor C11. As shown, DC power IN+ and IN− at approximately 24 Volts is applied to power block P1 and thus to the frame circuit 1020. The poly fuse F1 is connected in series with the input DC power to provide protection to the upstream power source powering frame circuit 1020. Also providing circuit protection is the suppressor R13. The rectifier D12 is connected to the fuse F1 and ensures that the correct polarity is supplied to the balance of the electronics/circuitry regardless of the polarity of the input voltage that is applied. A voltage VIN at approximately 24 Volts can then be obtained across the bridge rectifier D12. Voltage VIN is applied to the voltage regulator U6 to convert the 24 volts DC to 5 volts DC (VCC) for use by other circuit components U7 and U8. Output voltage VCC is provided across decoupling capacitor C11 to accommodate any variations in current draw from the balance of the frame circuit 1020.

In an embodiment of the present invention, timing oscillator component U7 is an RC timer oscillator having connected thereto voltage VCC to power the component U7, receives trigger signals across resistor R14 and capacitor C12, and provides the required timing utilizing a capacitor C13 and a resistor R15. The output pulse width is controlled by the values and combination of the external resistor R15 and capacitor C13. In the preferred embodiment illustrated herein, the time triggered signal outputs is a 5 volt square wave signal. The square wave signal is in turn provided to the bridge driver U8.

Driver U8 is an "H Bridge driver", which provides a 24 volt square wave output that is simultaneously available in both phases, to drive the primary winding L8 of the Inductive Coupled Power Transfer (ICPT) unit through a resonant capacitor C14.

Figure 23:
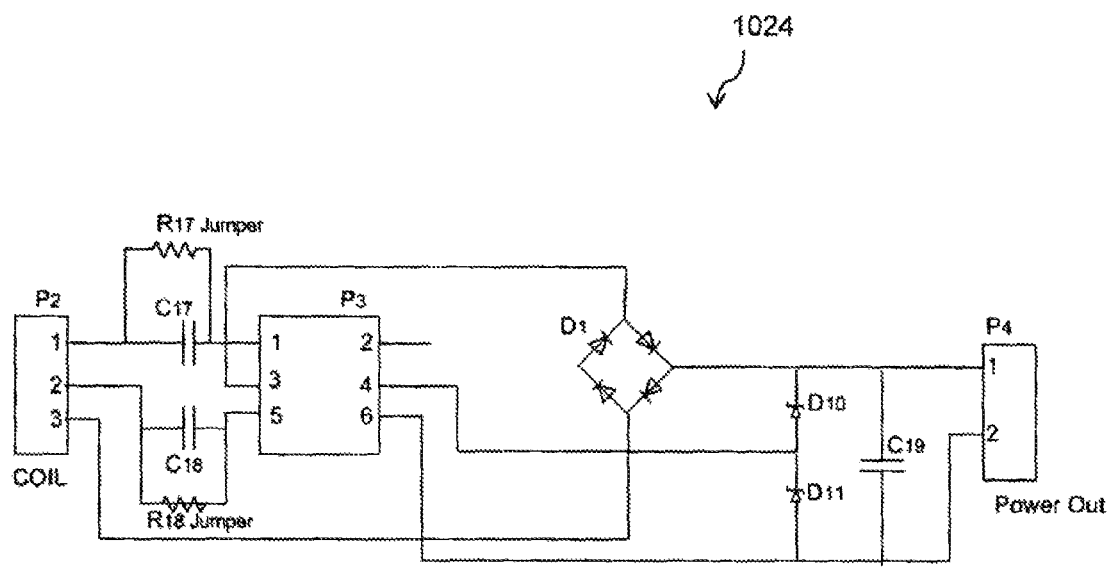
FIG. 23 is a schematic diagram of an exemplary door side receiving circuit.

FIG. 23 illustrates an exemplary implementation of a receiving door circuit 1024 for the door side of the present invention. In operation, the circuit 1024 receives signals from a secondary coil P2 of the ICPT, rectifies and filters the signal to provide 12/24 volts DC output, for providing power on the door side. The secondary coil P2 is center tapped thereby allowing the full winding to be used for 24 volt output while half of the winding will yield a 12 volt output. Resonant capacitors C17 and C18 are connected to the coil P2 to provide resonant coupling between the primary P1 and secondary P2 windings. A connector block P3 is provided to enable jumpers to be placed so as to provide ground at either the anode of zener diodes D10 or D11. The diodes D10, D11 regulate the 12/24 volt output (Vout) of circuit 1024 that is provided at block P4. A capacitor C19 is provided to filter the high frequency ripple on the output voltage Vout.

As previously stated, an aspect of the present invention is optimizing the resonance between the transmitter and receiver in order to maximize the amount of energy transferred therebetween. This aspect is further illustrated in the graphical representations of FIGS. 24 and 25 which are described below.

Figure 24:
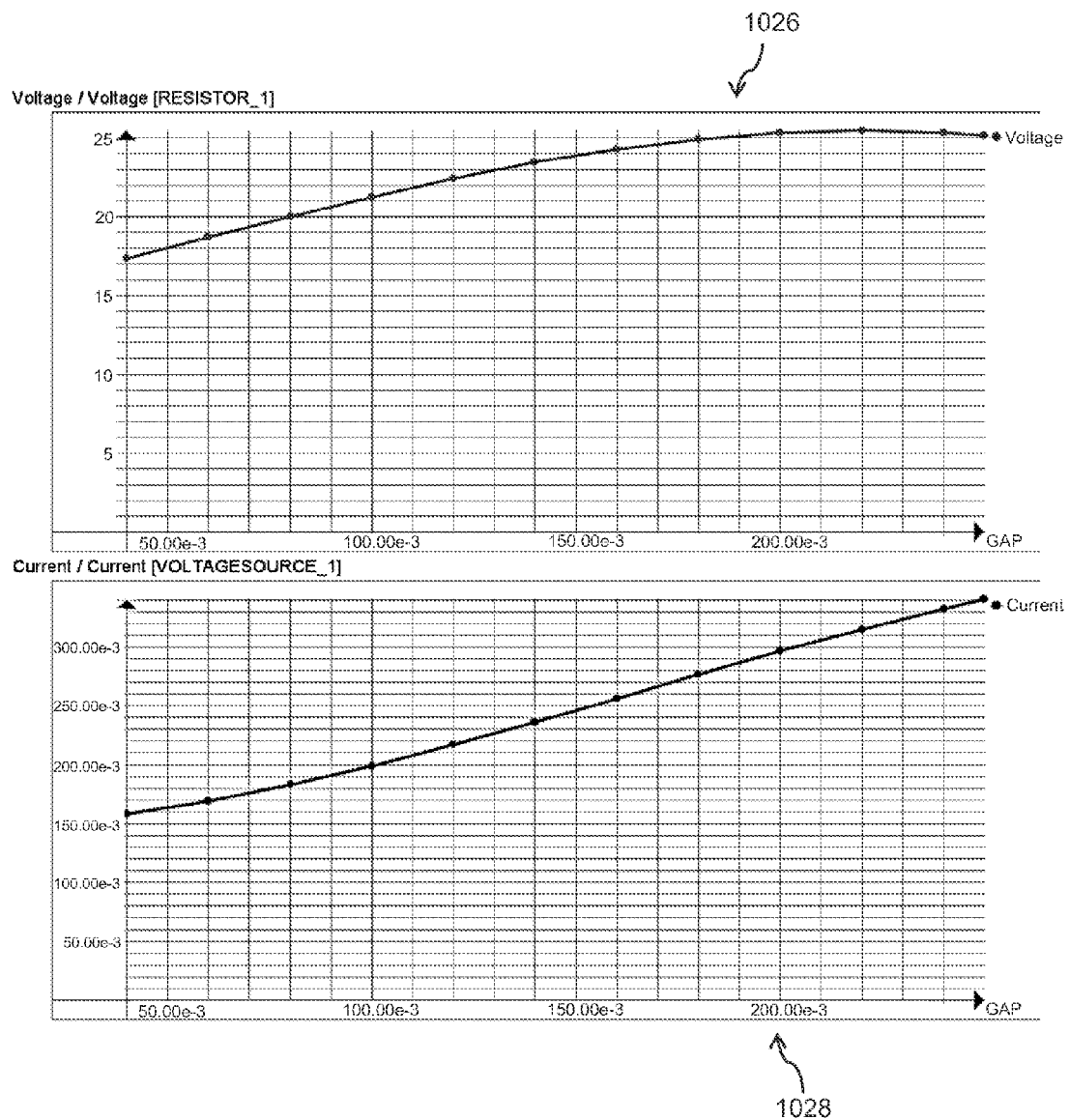
FIG. 24 is a graphical representation illustrating the relationship of gap between system cores and the output voltage as well as the input current for matched resonance capacitors.

FIG. 24 illustrates the results from tuning the resonant circuits of each pot core transformer to the same frequency. A first graph 1026 depicts Vout of the door side circuit 1002 over a range of gap sizes. A second graph 1028 depicts the input current (Iin) to the frame side circuit 1004 over a range of the gap sizes. As illustrated, it takes more current Iin as the cores move farther apart i.e. gap increases.

Figure 25:
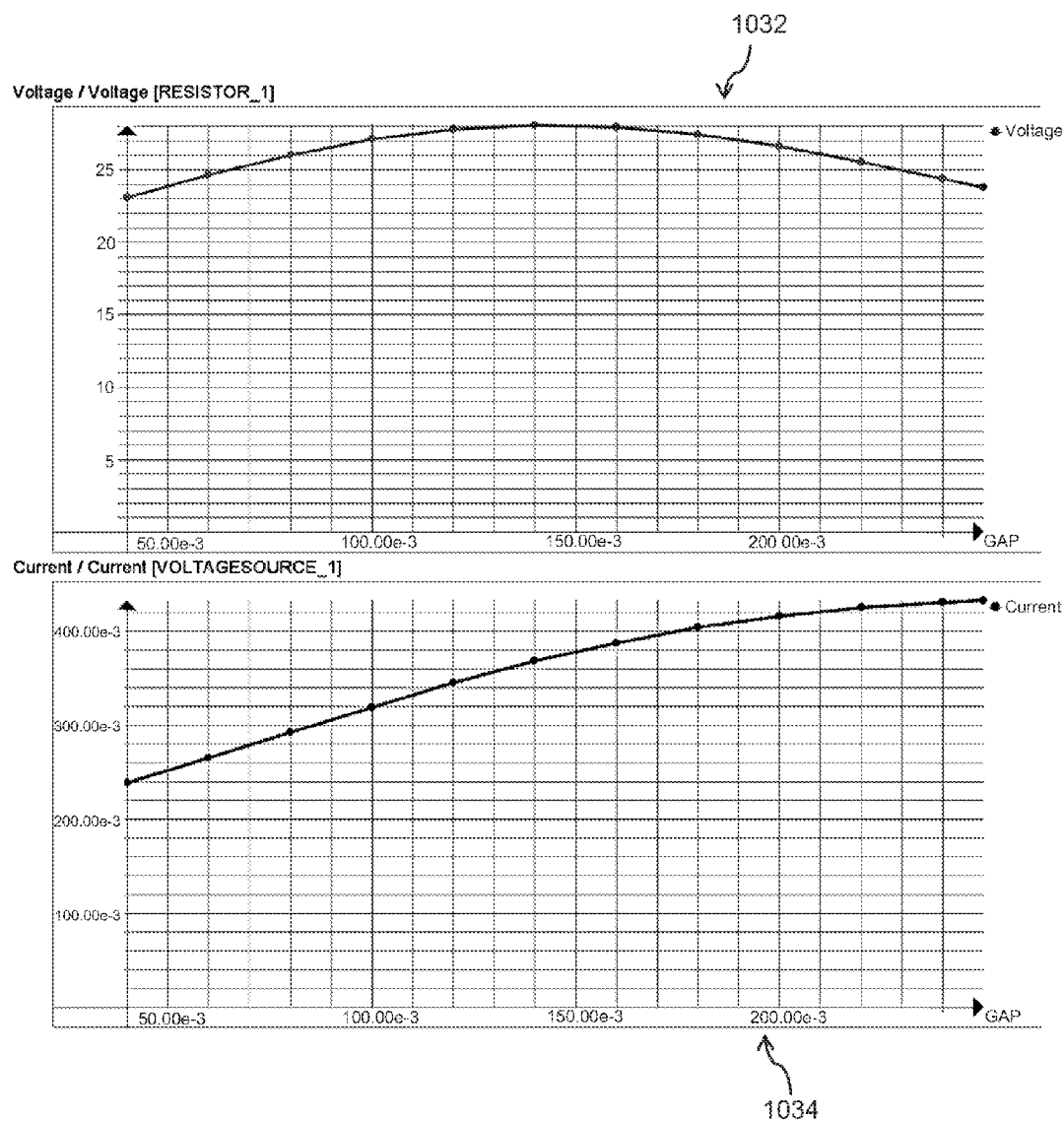
FIG. 25 is a graphical representation illustrating the relationship of gap between system cores and the output voltage as well as the input current for off tuned resonance capacitors.

FIG. 25 illustrates the results from off tuning the resonant circuits of opposing pot core transformers i.e. utilizing different frequencies, meaning utilizing different values for resonating capacitors 1006, 1014. A first graph 1032 depicts Vout of the door side circuit 1002 over a range of gap sizes. A second graph 1034 depicts the input current (Iin) to the frame side circuit 1004 over a range of the gap sizes. While the output voltage Vout is more consistent over the full gap range, a small price in efficiency is paid. It should be observed that the input current that is required over the same gap range of the matched resonance arrangement is comparatively higher.

As used herein efficiency is defined as:

$$((Vout)^2)/(RLOAD/(Vin*Iin))$$

While the invention has been described with reference to preferred embodiments, it will be understood by those skilled in the art that various changes may be made and equivalents may be substituted for elements or components thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the following claims.

What is claimed is:

1. A system for providing electric power and communication from a first object to a second object wherein at least one of said first and second objects is moveable with respect to the other, said system comprising:
   a transformer assembly including a first transformer portion having a first coil winding and a second transformer portion having a second coil winding, wherein said first transformer portion is configured for being disposed in said first object and wherein said second transformer portion is configured for being disposed in said second object;
   a first element configured for receiving said first transformer portion on said first object, said first element including a first contact surface;
   a second element configured for being slidably disposed in said second object and for receiving said second transformer portion, said second receiver element including a second contact surface;
   a biasing member configured for biasing said second contact surface toward said first contact surface so that said second contact surface engages said first contact surface to define a predetermined gap between said first transformer portion and said second transformer portion;
   wherein, when said first contact surface is engaged with said second contact surface, an application of a first alternating electric current through said first coil winding induces a second alternating current in said second coil winding.

2. A system in accordance with claim 1 wherein said first object is a door frame and said second object is a door hinged in said door frame.

3. A system in accordance with claim 1 wherein said first and second transformer portions are a pot core transformer portion.

4. A system in accordance with claim 1 wherein said second contact surface protrudes outwardly from a surface of said second object when said second contact surface is engaged with said first contact surface.

5. A system in accordance with claim 4 wherein said second contact surface includes a ramp taper.

6. A system in accordance with claim 1 wherein said first transformer portion includes a first fiber optic cable and said second transformer portion includes a second fiber optic cable, wherein when said first contact surface is engaged with said second contact surface, end surfaces of said first and second fiber optic cables are aligned so that light emitted from one of said first or second fiber optic cables and received by the other of said first or second fiber optic cables defines a communications signal between said first object and said second object.

7. A system in accordance with claim 2 wherein said door includes a lock body and said door frame includes a striker plate having an aperture, wherein said aperture is sized to receive a lock body deadbolt slide and wherein said first element is disposed in said sized aperture.

8. A system for providing electric power and communication from a first object to a second object wherein at least one of said first and second objects is moveable with respect to the other, comprising:
   a) a first transformer portion disposed on said first object adjacent said second object and having a first core half, a first coil winding and a first fiber optic cable;
   b) a second transformer portion disposed on said second object adjacent said first object and having a second core half, a second coil winding and a second fiber optic cable;
   c) first circuitry connected to said first transformer portion; and
   d) second circuitry connected to said second transformer portion;
   wherein application of a first alternating electric current through said first coil winding induces a second alternating current in said second coil winding, and
   wherein light emission from one of said first or second fiber optic cables and receipt of said light emission by the other of said first or second fiber optic cables defines a communications signal between said first object and said second object.

9. A system in accordance with claim 8 wherein said first object is a door frame and said second object is a door hinged in said door frame.

10. A system in accordance with claim 9 wherein said second transformer portion is positioned in said door to directly oppose said first transformer portion in close proximity thereto only when said door is in a closed position with respect to said frame.

11. A system in accordance with claim 9 wherein said first and second transformer portions are arranged in said door and frame respectively to minimize a gap between said first and second transformer portions when said door is in a closed position in said frame.

12. A system in accordance with claim 8 wherein a first resonance frequency of said first transformer portion is off-tuned from a second resonance frequency of said second transformer portion.

13. A system in accordance with claim 8 wherein said first and second transformer portions each have an external width less than one inch.

14. A system in accordance with claim 8 wherein said communication signals are communicated between said first and second objects up to a rate that is approximately 100 KB.

15. A system in accordance with the system of claim 8, wherein said first and second fiber optic cables are configured for transmitting and receiving data in both directions between said first and second objects.

16. A system for providing electric power and communication from a first object to a second object wherein at least one of said first and second objects is moveable with respect to the other, comprising:
   a) a first transformer fixedly disposed on said first object adjacent said second object and having a first core and a first coil winding;
   b) a second transformer fixedly disposed on said second object adjacent said first object and having a second core and a second coil winding;
   c) first circuitry connected to said first transformer; and
   d) second circuitry connected to said second transformer;
   wherein application of a first alternating electric current through said first coil winding induces a second alternating current in said second coil winding and wherein a first resonance frequency of said first transformer is off-tuned from a second resonance frequency of said second transformer.

17. A system in accordance with claim 16 wherein said first circuitry comprises a first resonating capacitor wherein capacitance of said first resonating capacitor can be varied to thereby tune the frequency of said first circuitry;
   wherein said second circuitry comprises a second resonating capacitor wherein capacitance of said second resonating capacitor can be varied to thereby tune the frequency of said second circuitry; and wherein each of said first and second resonating capacitors are connected in series with each of said first and second coil windings respectively.

18. A system in accordance with claim 17 wherein said first circuitry comprises:

a fused and protective power circuit;
a timing oscillator; and
a bridge driver;
said fused and protective power circuit having a bridge rectifier coupled to a transient voltage suppressor, said transient voltage suppressor coupled to a voltage regulator, said voltage regulator operatively connected to a decoupling capacitor, to provide a first output voltage across said coupling capacitor;
said power circuit providing said first output voltage to said timing oscillator, said timing oscillator providing a controlled pulse square wave signal across an RC circuit, said controlled pulsed square wave signal having an approximate value of 5 volts; and
said timing oscillator operatively connected to said bridge driver to thereby provide an approximately 24 volt square wave in two phases to drive said first coil winding.

19. A system in accordance with claim 18 wherein said second circuitry comprises:

a second coil winding that is center tapped wherein the full winding of said second coil may be utilized to provide a second output voltage of approximately 24 volts and half of said second coil may be utilized to alternatively provide a second output voltage of approximately 12 volts;
a pair of zener diodes, said zener diodes regulating the appropriate said second output voltage of said second circuitry;
means for providing a ground at either of the anodes of said pair of zener diodes; and
a filter capacitor;
said second coil winding connected at the full winding position to a third resonating capacitor and connected at the half winding position to a fourth resonating capacitor, said third and fourth resonating capacitors operatively connected to said ground providing means to regulate said second output voltage of said second circuit across said filter capacitor, said filter capacitor filtering high frequency ripple on said second output voltage of said second circuit.

20. A system in accordance with claim 16 wherein each of said transformer portions is a pot core transformer portion.

* * * * *